(12) United States Patent
Tsuchihara

(10) Patent No.: US 7,977,441 B2
(45) Date of Patent: Jul. 12, 2011

(54) ACETYLENE-BASED POLYMER

(75) Inventor: Kenji Tsuchihara, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 381 days.

(21) Appl. No.: 12/085,392

(22) PCT Filed: Nov. 24, 2006

(86) PCT No.: PCT/JP2006/323450
§ 371 (c)(1),
(2), (4) Date: May 22, 2008

(87) PCT Pub. No.: WO2007/061052
PCT Pub. Date: May 31, 2007

(65) Prior Publication Data
US 2009/0253872 A1    Oct. 8, 2009

(30) Foreign Application Priority Data

Nov. 25, 2005   (JP) .................................. 2005-340875

(51) Int. Cl.
*C08F 38/00* (2006.01)
*C08F 8/06* (2006.01)
*C08F 4/78* (2006.01)

(52) U.S. Cl. ...................... 526/284; 526/285; 525/328.1

(58) Field of Classification Search .................. 526/284, 526/285; 525/328.1
See application file for complete search history.

(56) References Cited

U.S. PATENT DOCUMENTS 4,447,583 A * 5/1984 Hocker et al. ............. 525/328.1
4,468,509 A * 8/1984 Naarmann et al. ............ 526/284

FOREIGN PATENT DOCUMENTS

| JP | 61-9412 A | 1/1986 |
|---|---|---|
| JP | 63-92619 A | 4/1988 |
| JP | 3-86738 A | 4/1991 |
| JP | 3-246505 A | 11/1991 |
| JP | 4-114106 A | 4/1992 |
| JP | 4-318801 A | 11/1992 |
| JP | 6-34813 A | 2/1994 |
| JP | 7-292037 A | 11/1995 |
| JP | 7-300512 A | 11/1995 |
| JP | 2003-137932 A | 5/2003 |
| JP | 2004-27182 A | 1/2004 |

OTHER PUBLICATIONS

Masuda, Toshio et al., Synthesis of acetylene-based widely conjugated polymers by metathesis polymerization and polymer properties, Journal of Molecular Catalysis A: Chemical, 2000, 160 (1), pp. 125-131.
Yamaguchi, Masahiko et al., Synthesis of deeply colored soluble polyacetylenes from 1-ethynylnaphthalene and 3, 6-dibuty1-9-ethynylphenanthrene, Chemistry Letters, 1992, (9), pp. 1667-1668.
Extended European Search Report issued on Feb. 24, 2010 in corresponding European Patent Application No. 06833254.3-2109/ 1964861 PCT/JP2006323450.

* cited by examiner

*Primary Examiner* — Fred M Teskin
(74) *Attorney, Agent, or Firm* — Birch, Stewart, Kolasch & Birch, LLP

(57) ABSTRACT

An acetylene-based polymer, comprising n recurring units represented by the following Formula (1):

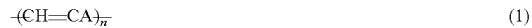

(1)

wherein, n is an integer of 10 to 10,000; each A represents a group selected from a naphthyl group, a phenanthryl group, a pyrenyl group and an anthryl group, which is mono- or di-substituted with a group selected from alkyl groups, alkyl groups substituted with aromatic hydrocarbon groups, $R^1$—O— groups, —S—$R^2$ groups, —N$R^3R^4$ groups, a cyano group, a carboxyl group, $R^5SO_2$— groups, —COO$R^6$ groups, —CON($R^7$)($R^8$) groups and —CO$R^9$ groups (each of $R^1$, $R^5$, $R^6$ and $R^9$ is an alkyl group, each of $R^2$, $R^3$, $R^4$, $R^7$ and $R^8$ is a hydrogen atom or an alkyl group); and the recurring units may be the same as or different from each other.

15 Claims, 11 Drawing Sheets

Full line: a film formed after FeCl₃ doping
Dotted line: the above mentioned film exposed to an ammonia vapor Full line: a film immediately after film formation
Dotted line: a film exposed to a nitric acid vapor
Broken line: a film further exposed to an ammonia vapor after being exposed to a nitric acid vapor Full line: a film immediately after film formation
Dotted line: the above mentioned film heated at 200 °C for 5 minutes Full line: a film immediately after film formation
Dotted line: the above mentioned film heated at 200°C for 5 minutes

ACETYLENE-BASED POLYMER

TECHNICAL FIELD

The present invention relates to an acetylene-based polymer that is useful, for example, as a conjugated transparent polymeric material.

BACKGROUND ART

A variety of polymeric compounds have been actively developed so far, and such polymeric compounds have been used as various structural or functional materials.

Examples of such polymeric compounds include acetylene-based polymeric compounds such as substituted polyacetylene compounds. Substituted polyacetylenes are known to show specific properties due to their unique structures. These polymers have solubility, in-air stability and others significantly varying depending on the kind of the substituent group. These polymers have a main chain structure more rigid than those of vinyl polymers, and thus, it may be possible to raise permeability of a substance such as gas, by having a wide intermolecular chain distance by presence of a bulky substituent group. In addition, these polymers, which have main-chain conjugation, are known to show various colors according to the kind of the substituent group introduced. It is known that poly(diphenylacetylene)s can be prepared at a high weight-average molecular weight (Mw) of 1,000,000 or more and have superior thermal stability. However, the poly(diphenylacetylene)s are insoluble in any solvent, and do not have melting points, raising a problem in processability.

Substituted polyacetylene compounds developed include the followings:

o-(triallylxylyl)phenyl acetylene polymer (see JP-A-63-92619 ("JP-A" means unexamined published Japanese patent application)), 1-phenyl-2-(p-trimethylsilylphenyl)acetylene polymer (see JP-A-4-114106), o-(trimethylsilyl)phenylacetylene polymer (see JP-A-3-246505 and JP-A-3-86738), o-(dimethylsilyl)phenylacetylene polymer (see JP-A-4-318801), and o-(trimethylgermylphenyl)acetylene polymer (see JP-A-6-34813).

These polymeric compounds are resistant to solvent and heat, and colorations of these compounds are able to be reduced by oxidation. However, there exists a demand for a material for practical purposes that has longer main-chain conjugation and acquires higher transparency by simple and stable oxidation treatment and that can be converted to a colorless material.

DISCLOSURE OF INVENTION

An object of the present invention is to provide a novel substituted polyacetylene compound resistant to solvent and heat and soluble in various organic solvents that has long main-chain conjugation and can be made highly transparent by simple chemical oxidation/reduction treatment.

After intensive studies, the present inventors have found that a substituted polyacetylene having a particular substituent and long main-chain conjugation bond shows deep color owing to the presence of the long main-chain conjugation, and the polymeric compound having long conjugation length can be obtained by introducing a long side-chain substituent thereon, and also such a polymeric compound can be converted to a material which is soluble in various organic solvents and is easy to process. A substituted polyacetyleneoxide obtained by oxidation of the substituted polyacetylene is highly improved in transparency to the extent coloration cannot be found, and thus, a polymer with such properties can be used as a material useful, for example, as a transparent conductive material. The present invention is made, based on these findings.

The present invention provides the following means:

(1) An acetylene-based polymer, comprising n recurring units represented by the following Formula (1):

  (1)

wherein, n is an integer of 10 to 10,000; each A represents a group selected from a naphthyl group, a phenanthryl group, a pyrenyl group and an anthryl group, which is mono- or di-substituted with a group selected from alkyl groups having 1 to 40 carbon atoms, alkyl groups substituted with aromatic hydrocarbon groups (alkyl groups having 1 to 40 carbon atoms), $R^1$—O— groups ($R^1$ is an alkyl group having 1 to 40 carbon atoms), —S—$R^2$ groups ($R^2$ is a hydrogen atom or an alkyl group having 1 to 40 carbon atoms), —$NR^3R^4$ groups ($R^3$ and $R^4$ are a hydrogen atom or an alkyl group having 1 to 40 carbon atoms, which may be the same as or different from each other), a cyano group, a carboxyl group, $R^5SO_2$— groups ($R^5$ is an alkyl group having 1 to 40 carbon atoms), —$COOR^6$ groups ($R^6$ is an alkyl group having 1 to 40 carbon atoms), —$CON(R^7)(R^8)$ groups ($R^7$ and $R^8$ are a hydrogen atom or an alkyl group having 1 to 40 carbon atoms, which may be the same as or different from each other) and —$COR^9$ groups ($R^9$ is an alkyl group having 1 to 40 carbon atoms); and the recurring units may be the same as or different from each other.

(2) An acetylene-based polymer, comprising n recurring units represented by the following Formula (2):

  (2)

wherein, n is an integer of 10 to 10,000; each $A^1$ represents a 1-naphthyl group or a 2-naphthyl group, which is mono- or di-substituted, at the positions of 2, 3 or 4 when it is a 1-naphthyl group or at the positions of 1, 3 or 4 when it is a 2-naphthyl group, with a group selected from alkyl groups having 1 to 40 carbon atoms, alkyl groups substituted with aromatic hydrocarbon groups (alkyl groups having 1 to 40 carbon atoms), $R^{10}$—O— groups ($R^{10}$ is an alkyl group having 1 to 40 carbon atoms), —S—$R^{11}$ groups ($R^{11}$ is a hydrogen atom or an alkyl group having 1 to 40 carbon atoms), —$NR^{12}R^{13}$ groups ($R^{12}$ and $R^{13}$ are a hydrogen atom or an alkyl group having 1 to 40 carbon atoms, which may be the same as or different from each other), a cyano group, a carboxyl group, $R^{14}SO_2$— groups ($R^{14}$ is an alkyl group having 1 to 40 carbon atoms), —$COOR^{15}$ groups ($R^{15}$ is an alkyl group having 1 to 40 carbon atoms), —$CON(R^{16})(R^{17})$ groups ($R^{16}$ and $R^{17}$ are a hydrogen atom or an alkyl group having 1 to 40 carbon atoms, which may be the same as or different from each other) and —$COR^{18}$ groups ($R^{18}$ is an alkyl group having 1 to 40 carbon atoms); and the recurring units may be the same as or different from each other.

(3) An acetylene-based polymer, obtained by oxidation of the acetylene-based polymer described in (1) for removal of the main chain electrons.

(4) An acetylene-based polymer, obtained by oxidation of the acetylene-based polymer described in (2) for removal of the main chain electrons.

(5) A method of producing an acetylene-based polymer having n recurring units represented by the following Formula (1), comprising polymerizing a monomer represented by the following Formula (3) in the presence of a metal compound represented by $MX_n$ (wherein, M represents a metal selected from W, Mo, Cr, Ta, Nb, Mn, Ni, Pd, Ru and Rh; X is selected from halogen atoms and CO; and n is an integer) or an organometallic complex represented by $MX_nY_m$ (wherein, M represents a metal selected from W, Mo, Cr, Ta, Nb, Mn, Ni, Pd, Ru, and Rh; X represents an atom or group selected from halogen atoms, CO, and a hydrogen atom; Y represents an organic group selected from cyclooctadiene, norbornadiene, acetylacetonate, olefins, dienes, alkylenes, and alkyls):

(3)

(1)

wherein, n is an integer of 10 to 10,000; A represents a group selected from a naphthyl group, a phenanthryl group, a pyrenyl group and an anthryl group, which is mono- or di-substituted with a group selected from alkyl groups having 1 to 40 carbon atoms, alkyl groups substituted with aromatic hydrocarbon groups (alkyl groups having 1 to 40 carbon atoms), $R^1$—O— groups ($R^1$ is an alkyl group having 1 to 40 carbon atoms), —S—$R^2$ groups ($R^2$ is a hydrogen atom or an alkyl group having 1 to 40 carbon atoms), —$NR^3R^4$ groups ($R^3$ and $R^4$ are a hydrogen atom or an alkyl group having 1 to 40 carbon atoms, which may be the same as or different from each other), a cyano group, a carboxyl group, $R^5SO_2$— groups ($R^5$ is an alkyl group having 1 to 40 carbon atoms), —$COOR^6$ groups ($R^6$ is an alkyl group having 1 to 40 carbon atoms), —$CON(R^7)(R^8)$ groups ($R^7$ and $R^8$ are a hydrogen atom or an alkyl group having 1 to 40 carbon atoms, which may be the same as or different from each other) and —$COR^9$ groups ($R^9$ is an alkyl group having 1 to 40 carbon atoms); and the recurring unit may be the same as or different from each other.

(6) An acetylene-based polymer, comprising n recurring units represented by the following Formula (2):

(2)

wherein, n is an integer of 10 to 10,000; each $A^1$ represents a 1-naphthyl or a 2-naphthyl group, which is mono- or di-substituted, at the positions of 2, 3 or 4 when it is a 1-naphthyl group or at the positions of 1, 3 or 4 when it is a 2-naphthyl group, with a group selected from alkyl groups having 1 to 40 carbon atoms, alkyl groups substituted with aromatic hydrocarbon groups (alkyl groups having 1 to 40 carbon atoms), $R^{10}$—O— groups ($R^{10}$ is an alkyl group having 1 to 40 carbon atoms), —S—$R^{11}$ groups ($R^{11}$ is a hydrogen atom or an alkyl group having 1 to 40 carbon atoms), —$NR^{12}R^{13}$ groups ($R^{12}$ and $R^{13}$ are a hydrogen atom or an alkyl group having 1 to 40 carbon atoms, which may be the same as or different from each other), a cyano group, a carboxyl group, $R^{4}SO_2$— groups ($R^{14}$ is an alkyl group having 1 to 40 carbon atoms), —$COOR^{15}$ groups ($R^{15}$ is an alkyl group having 1 to 40 carbon atoms), —$CON(R^{16})(R^{17})$ groups ($R^{16}$ and $R^{17}$ are a hydrogen atom or an alkyl group having 1 to 40 carbon atoms, which may be the same as or different from each other) and —$COR^{18}$ groups ($R^{18}$ is an alkyl group having 1 to 40 carbon atoms), where at least one of these groups is a group having chirality; and the recurring unit may be the same as or different from each other.

(7) An acetylene-based polymer, obtained by oxidation of the acetylene-based polymer described in (6) for removal of the main chain electrons.

(8) An acetylene-based polymer, obtained by heat treatment of the acetylene-based polymer described in (1) for imparting crystallinity.

(9) An acetylene-based polymer, obtained by heat treatment of the acetylene-based polymer described in (2) for imparting crystallinity.

(10) An acetylene-based polymer, obtained by heat treatment of the acetylene-based polymer described in (6) for imparting crystallinity.

The acetylene-based polymer according to the present invention has a structure of long main-chain conjugation having a particular substituent group, and thus, is resistant to solvent and heat, soluble in various organic solvents, and colored, and the length of conjugation may be modified according to the length of the side-chain substituent group. The term "long main-chain conjugation" means that the distance of electrons or solitons movable on the main chain is equivalent to approximately ten double bonds or more and the absorption maximum is around 500 nm or more. Such an acetylene-based polymer can be converted into a colorless transparent state by simple chemical oxidation/reduction treatment. With such properties, the polymer may be used as a material for transparent conductive materials, transparent nonlinear optical materials, and electrochromic elements. In addition, the polymer may be used, for example, as an electronic paper, a transparent electromagnetic shield, or the like.

Other and further features and advantages of the invention will appear more fully from the following description, appropriately referring to the accompanying drawings.

Figure 11:
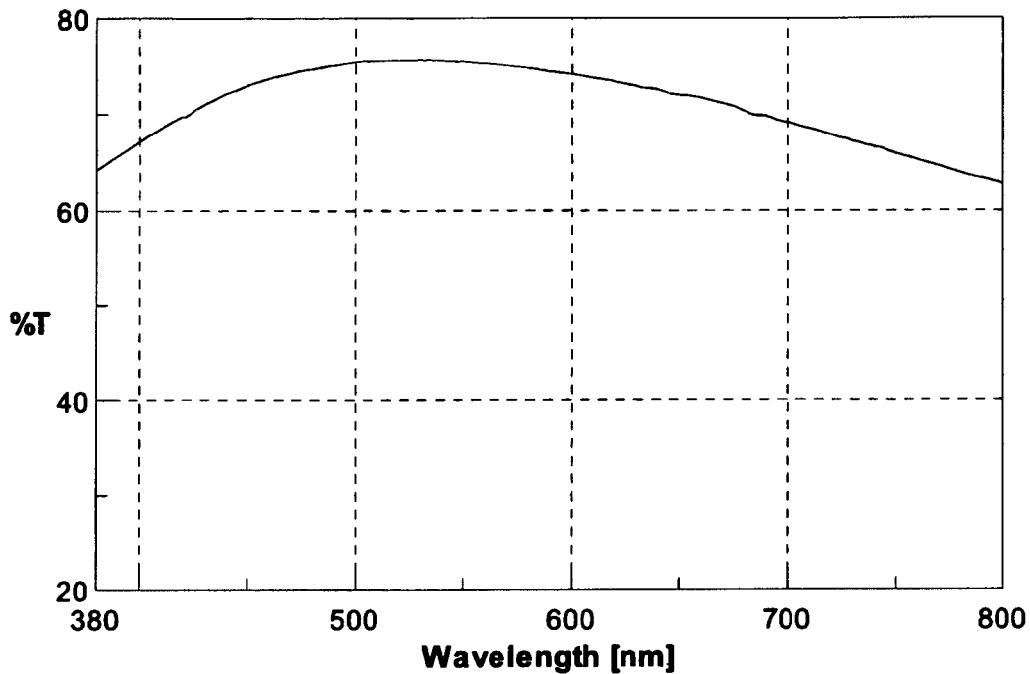

FIG. 11 is a graph showing the results of percent transmission measurement of a film of the poly(1-ethynyl-2-(2-ethylhexyl)naphthalene) prepared in Example 8 that is previously oxidized with AuCl$_3$ and coated on a glass surface.

Figure 12:
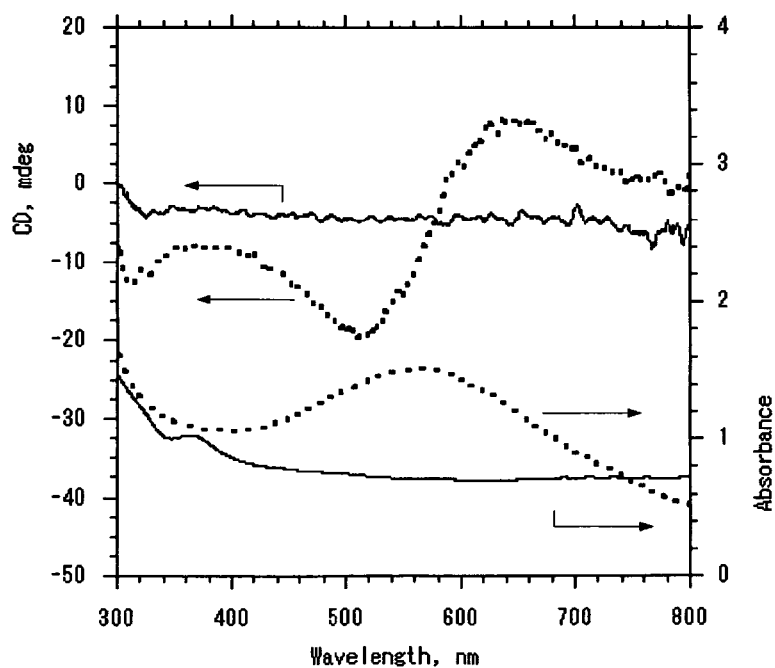

FIG. 12 is a graph showing the UV and CD spectra of the polymer film prepared in Example 9.

Figure 13:
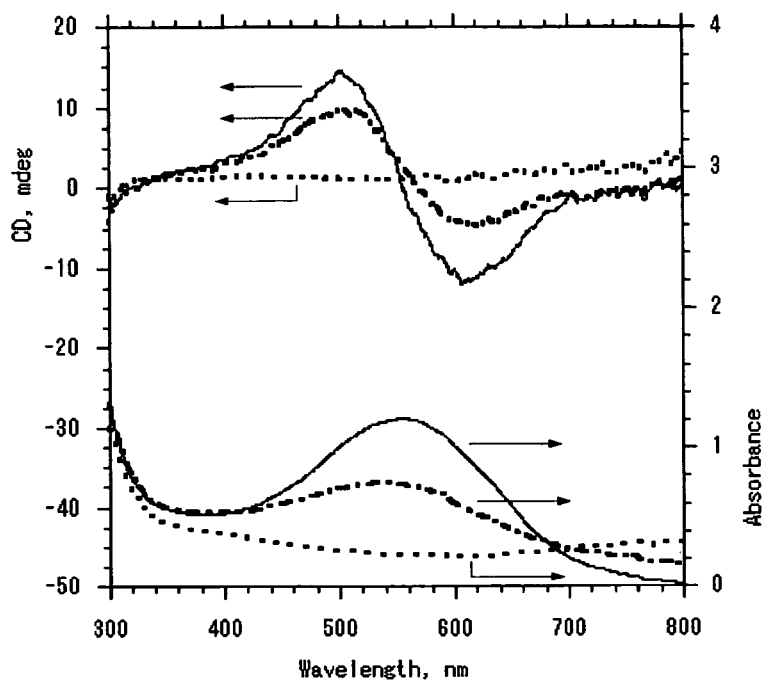

FIG. 13 is a graph showing the UV and CD spectra of the polymer film prepared in Example 10.

Figure 14:
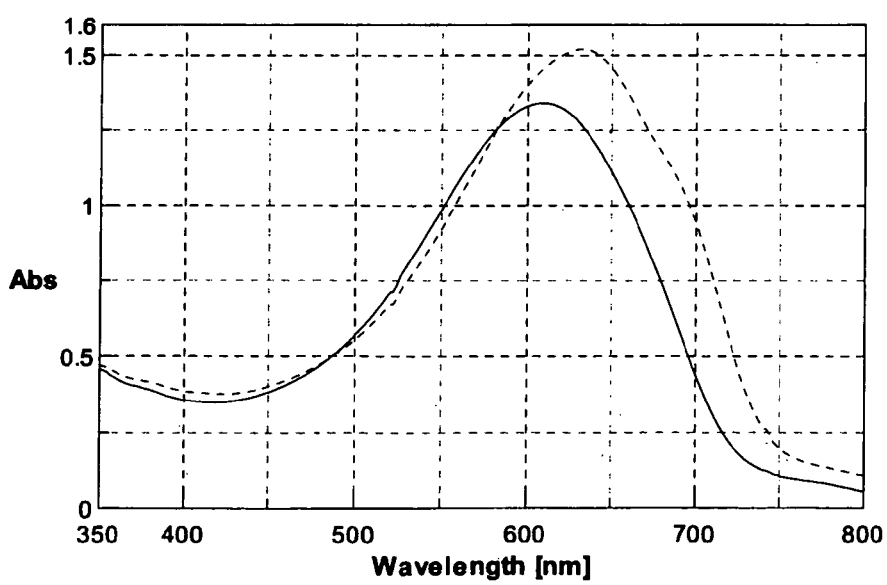

FIG. 14 is a graph showing the UV spectrum of the polymer film prepared in Example 11 before and after heating.

Figure 15:
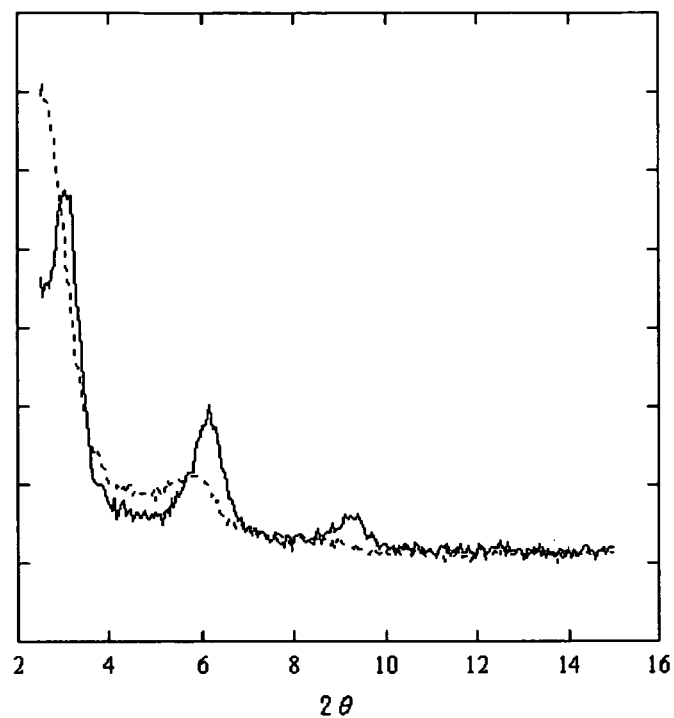

FIG. 15 is a graph showing the wide-angle X-Ray scattering of the polymer film prepared in Example 11 before and after heating.

Figure 16:
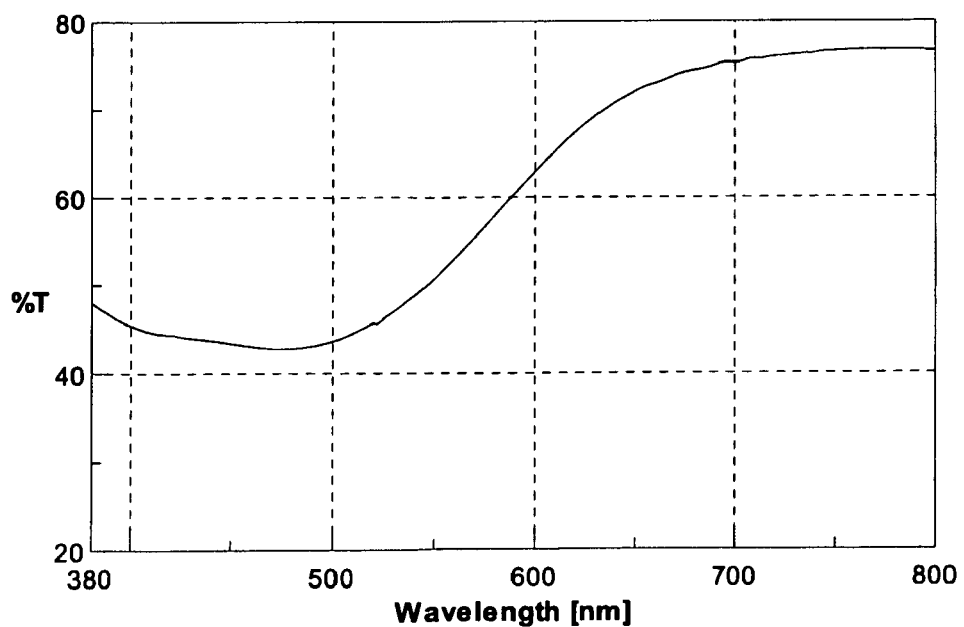

FIG. 16 is a graph showing the results of the percent transmission measurement of a film of the poly(o-trimethylsilylphenyl acetylene) prepared in Comparative Example 1 that is oxidized with FeCl$_3$ and coated on a glass surface.

Figure 17:
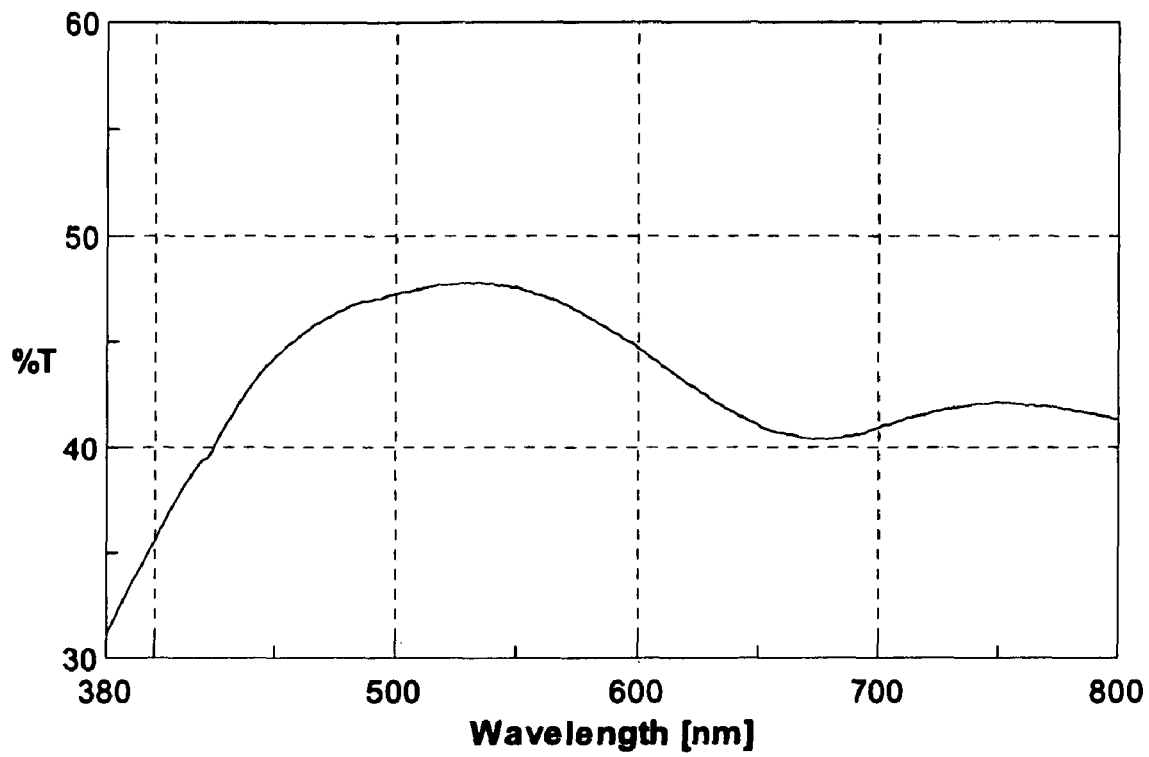

FIG. 17 is a graph showing the results of percent transmission measurement of a film of the poly(ethynylnaphthalene) prepared in Comparative Example 2 that is oxidized with FeCl$_3$ and coated on a glass surface.

Figure 18:
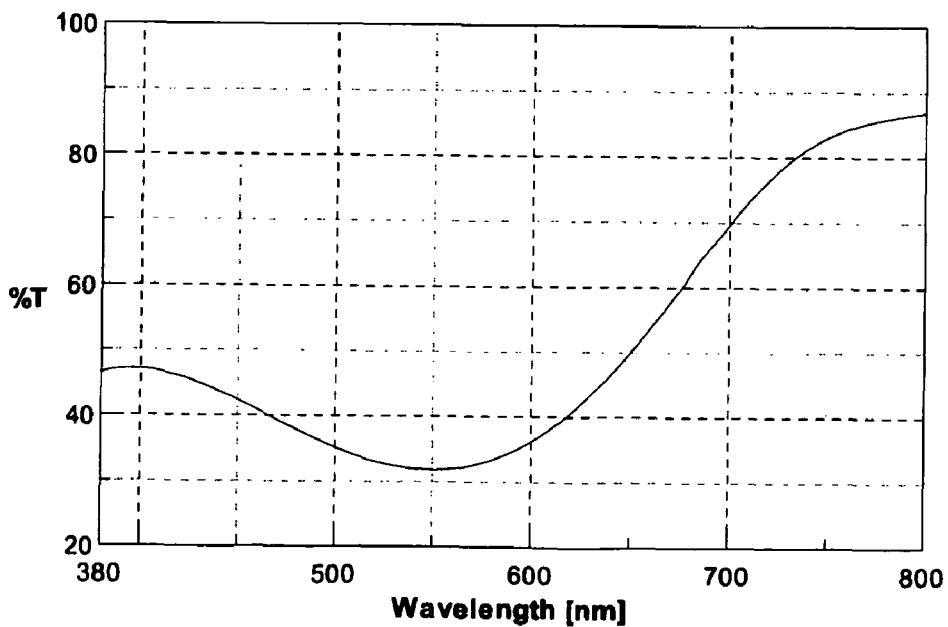

FIG. 18 is a graph showing the results of percent transmission measurement of a film of the poly(1-ethynyl-2-ethoxynaphthalene) prepared in Example 3(2) that is coated on a glass surface.

Figure 19:
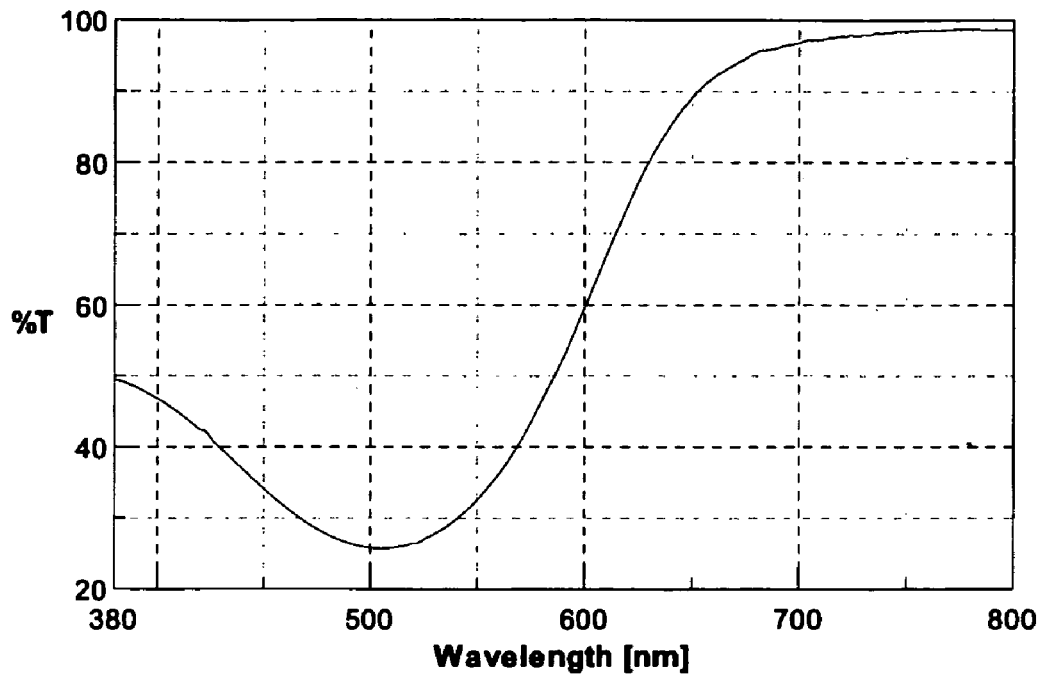

FIG. 19 is a graph showing the results of percent transmission measurement of a film of the poly(1-ethynyl-4-methylnaphthalene) prepared in Example 4(2) that is coated on a glass surface.

Figure 20:
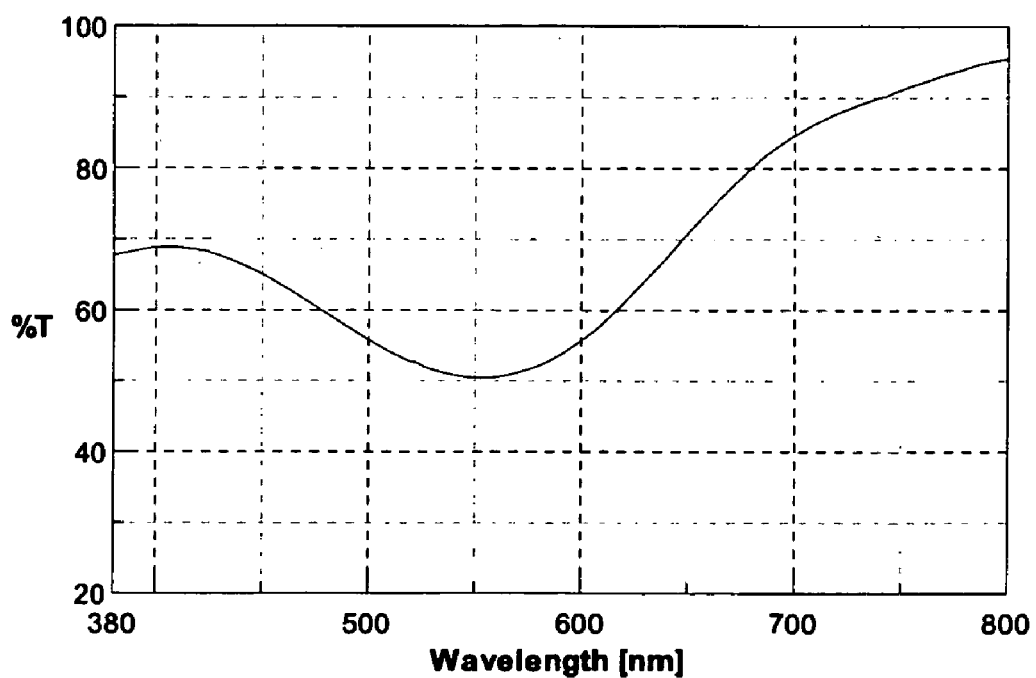

FIG. 20 is a graph showing the results of percent transmission measurement of a film of the poly(1-ethynyl-2-n-(3-phenylpropyl)naphthalene) prepared in Example 7(2) that is coated on a glass surface.

Figure 21:
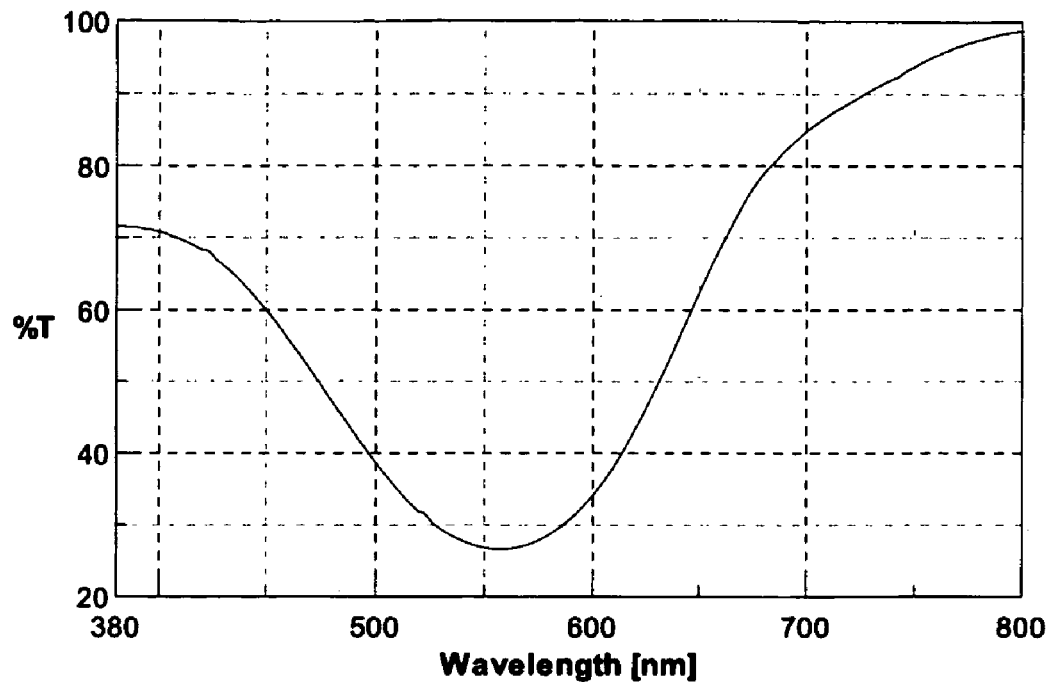

FIG. 21 is a graph showing the results of percent transmission measurement of a film of the poly(1-ethynyl-2-(2-ethylhexyl)naphthalene) prepared in Example 8(2) that is coated on a glass surface.

Figure 22:
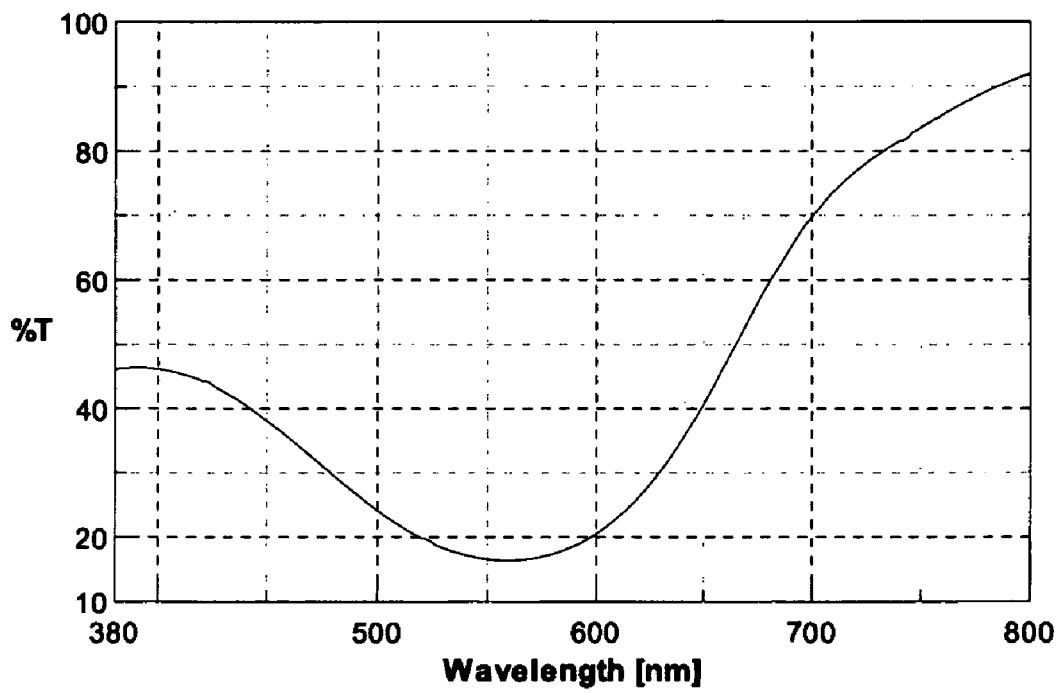

FIG. 22 is a graph showing the results of percent transmission measurement of a film of the poly(1-ethynyl-2-(2-(S)-methylbutyl)naphthalene) prepared in Example 10(1) that is coated on a glass surface.

BEST MODE FOR CARRYING OUT THE INVENTION

Hereinafter, the present invention will be described in detail. The acetylene-based polymer according to the present invention is an acetylene-based polymer having n recurring units represented by the following Formula (1):

(1)

wherein, n is an integer of 10 to 10,000.

Each A represents a group selected from a naphthyl group, a phenanthryl group, a pyrenyl group and an anthryl group, which is mono- or di-substituted with a group selected from alkyl groups having 1 to 40 carbon atoms, alkyl groups substituted with aromatic hydrocarbon groups (alkyl groups having 1 to 40 carbon atoms), $R^1$—O— groups ($R^1$ is an alkyl group having 1 to 40 carbon atoms), —S—$R^2$ groups ($R^2$ is a hydrogen atom or an alkyl group having 1 to 40 carbon atoms), —NR$^3$R$^4$ groups ($R^3$ and $R^4$ are a hydrogen atom or an alkyl group having 1 to 40 carbon atoms, which may be the same as or different from each other), a cyano group, a carboxyl group, $R^5SO_2$— groups ($R^5$ is an alkyl group having 1 to 40 carbon atoms), —COOR$^6$ groups ($R^6$ is an alkyl group having 1 to 40 carbon atoms), —CON($R^7$)($R^8$) groups ($R^7$ and $R^8$ are a hydrogen atom or an alkyl group having 1 to 40 carbon atoms, which may be the same as or different from each other) and —COR$^9$ groups ($R^9$ is an alkyl group having 1 to 40 carbon atoms).

Favorable acetylene-based polymers include the followings:
those having a substituent group(s) at a positions of 2, 3 or 4 when A represents a 1-naphthyl group;
those having a substituent group(s) at a positions of 1, 3 or 4 when A represents a 2-naphthyl group;
those having a substituent group at the position of 10 when A represents a 9-phenanthryl group;
those having a substituent group at the position of 2 when A represents a 1-phenanthryl group;
those having a substituent group(s) at a positions of 2, 3 or 4 when A represents a 1-pyrenyl group;
those having a substituent group at the position of 10 when A represents a 9-anthryl group; and
those having a substituent group at the position of 2 when A represents a 1-anthryl group.

Each of these substituent groups may be substituted additionally with the same group.

The weight-average molecular weight of the acetylene-based polymer is 2,000 to 5,000,000.

In addition, the present invention also provides an acetylene-based polymer characterized by having n recurring units represented by the following Formula (2):

(2)

wherein, n is an integer of 10 to 10,000.

Each $A^1$ represents a 1-naphthyl group or a 2-naphthyl group, which is mono- or di-substituted at the positions of 2, 3 or 4 when it is a 1-naphthyl group or at the positions of 1, 3 or 4 when it is a 2-naphthyl group with a group selected from alkyl groups having 1 to 40 carbon atoms, alkyl groups substituted with aromatic hydrocarbon groups (alkyl groups having 1 to 40 carbon atoms), $R^{10}$—O— groups ($R^{10}$ is an alkyl group having 1 to 40 carbon atoms), —S—$R^{11}$ groups ($R^{11}$ is a hydrogen atom or an alkyl group having 1 to 40 carbon atoms), —NR$^{12}$R$^{13}$ groups ($R^{12}$ and $R^{13}$ are a hydrogen atom or an alkyl group having 1 to 40 carbon atoms, which may be the same as or different from each other), a cyano group, a carboxyl group, $R^{14}SO_2$— groups ($R^{14}$ is an alkyl group having 1 to 40 carbon atoms), —COOR$^{15}$ groups ($R^{15}$ is an alkyl group having 1 to 40 carbon atoms), —CON($R^{16}$)($R^{17}$) groups ($R^{16}$ and $R^{17}$ are a hydrogen atom or an alkyl group having 1 to 40 carbon atoms, which may be the same as or different from each other) and —COR$^{18}$ groups ($R^{18}$ is an alkyl group having 1 to 40 carbon atoms).

The weight-average molecular weight of the acetylene-based polymer is 2,000 to 5,000,000.

Each end group of the acetylene-based polymer (1) or (2) described above depends on the kind of the terminator used during polymerization and is a hydrogen atom or an alkyl group such as methyl, ethyl or butyl, as shown in the following Formula (4) (the following Formula (4) corresponds to Formula (1) above, and A should be replaced by $A^1$ in the case of Formula (2)).

(4)

(wherein, each A corresponds to that in the acetylene-based polymer (1) or (2)).

The alkyl group in the substituent group on the aryl group above or in the substituent group having an alkyl group is an alkyl group having 1 to 40 carbon atoms. Specific examples thereof include a methyl group, an ethyl group, an n-propyl group, an i-propyl group, an n-butyl group, an i-butyl group, a tert-butyl group, an n-pentyl group, an i-pentyl group, a tert-pentyl group, an n-hexyl group, an i-hexyl group, an n-heptyl group, a 2-methylheptyl group, an n-octyl group, a 2-methylheptyl group, an n-nonyl group, a 2-methylnonyl group, an n-decanyl group, a 2-methyldecanyl group, an n-undecanyl group, a 2-methylundecanyl group, an n-dodecanyl group, a 2-methyl-dodecanyl group, an n-tridecanyl group, a 2-methyltridecanyl group, an n-tetradecanyl group, a 2-methyltetradecanyl group, an n-pentadecanyl group, a 2-methylpentadecanyl group, an n-hexadecanyl group, a 2-methylhexadecanyl group, an n-heptadecanyl group, a 2-methylheptadecanyl group, an n-octadecanyl group, a 2-methyloctadecanyl group, an n-nonadecanyl group, a 2-methylnonadecanyl group, an n-eicosanyl group, a 2-methyleicosanyl group, an n-heneicosanyl group, a 2-methylheneicosanyl group, a 2-methyldocosanyl group, an n-docosanyl group, an n-tricosanyl group, a 2-methyl-n-tricosanyl group, an n-tetracosanyl group, a 2-methyltetracosanyl group, an n-pentacosanyl group, a 2-methylpentacosanyl group, a 2-methylhexacosanyl group, an n-hexacosanyl group, an n-heptacosanyl group, a 2-methylheptacosanyl group, an n-octacosanyl group, a 2-methyloctacosanyl group, an n-nonacosanyl group, a 2-methyl nonacosanyl group, an n-triacontanyl group, a 2-methyltriacontanyl group, an n-dotriacontanyl group, a 2-methyltritriacontanyl group, a n-tetracontanyl group, and a 2-methyltetracontanyl group.

Among them, alkyl groups having 1 to 20 carbon atoms are preferable, and the specific examples thereof include a methyl group, an ethyl group, an n-propyl group, an n-butyl group, an n-hexyl group, an n-decyl group, an n-octadecyl group, and a 2-methylhexyl group.

When the naphthyl group $A^1$ on the polymer recurring unit in the polymer represented by Formula (2) has a chiral alkyl group or a substituent group having the same, the alkyl group is preferably one of the followings:

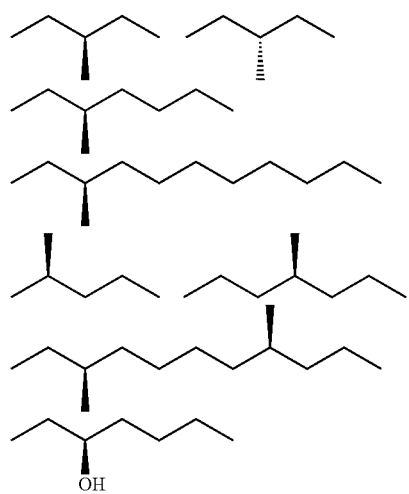

In the Formula above, the aromatic hydrocarbon represents a phenyl group that may be substituted with an alkyl group. The alkyl group for alkyl substitution is an alkyl group having 1 to 3 carbon atoms.

Specific examples of the recurring units in the acetylene-based polymer according to the present invention include the followings:

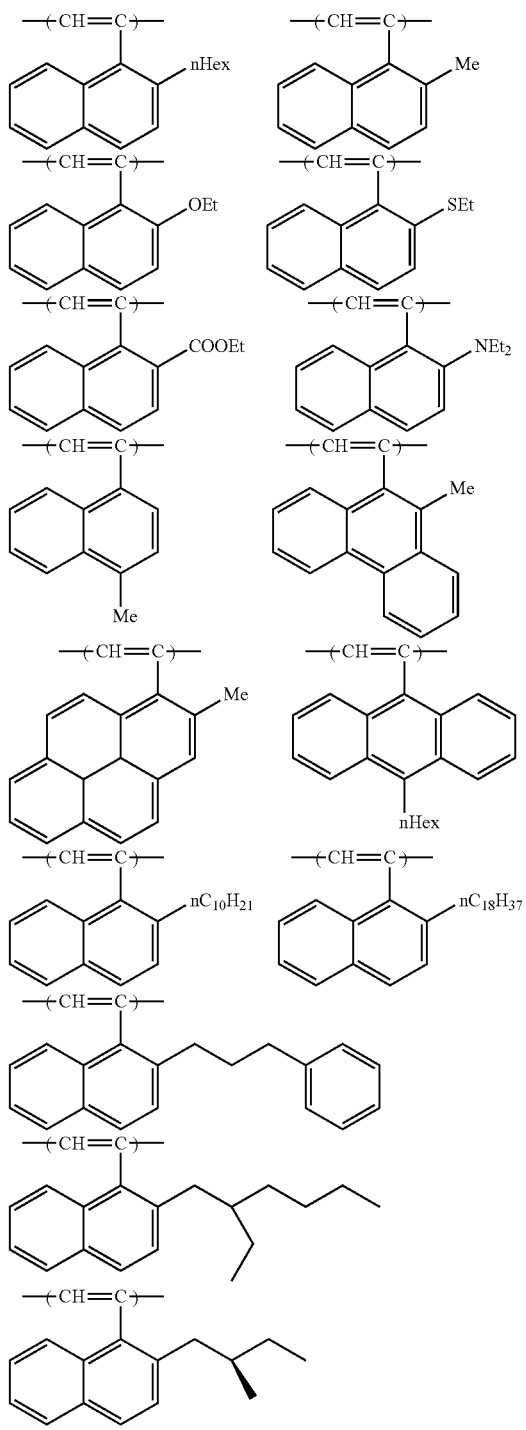

Polymerization reaction of the raw material, i.e., the compound represented by the following Formula (3) or (5), in the presence of a catalyst gives the acetylene-based polymer. Examples of the catalysts include metal compounds and organometallic complexes. The reaction gives an acetylene-based polymer having the recurring unit represented by the following Formula (1) or (2). During reaction, the raw material is heated by adding a catalyst. The viscosity of the polymer increases with the progress of the reaction. The reaction is terminated as appropriate according to the progress of the polymerization. The molecular weight of the polymer obtained is preferably in the range of 2,000 or more and about $500 \times 10^4$, as weight-average molecular weight.

$$CH\equiv CA \quad (3)$$

(wherein, A is the same as that described above, and the favorable examples are also the same).

$$CH\equiv CA^1 \quad (5)$$

(wherein, $A^1$ is the same as that described above, and the favorable examples are also the same).

Specific examples of the alkyl groups or the alkyl groups contained in substituent groups in Formulae (3) and (5) described above are the same as those described above.

$$-(CH=CA)_{\overline{n}} \quad (1)$$

wherein, n and A are the same as those described above.

$$-(CH=CA^1)_{\overline{n}} \quad (2)$$

wherein, n and $A^1$ are the same as those described above.

Catalysts consisting of the metal compound are represented by the following Formula:

$$MX_n$$

wherein, M is a metal element in Groups 5 to 10 and selected from W, Mo, Cr, Ta, Nb, Mn, Ni, Pd, Ru and Rh. X is selected from halogen atoms and CO. The halogen atom is an atom selected from a chlorine, a fluorine, a bromine and an iodine.

Specific examples of the metal compound catalysts include $WCl_6$, $WBr_6$, $WI_6$, $WF_6$, $W(CO)_6$, $MoCl_5$, $CrCl_3$, $TaCl_5$, $NbCl_5$, $MnCl_3$, $PdCl_3$, $RuCl_3$, $RhCl_3$ and the like.

The organometallic complexes are represented by the following Formula:

$$MX_nY_m$$

(wherein, M is a metal element in Groups 5 to 10; X represents an inorganic group; and Y represents an organic group).

The metal M is selected from W, Mo, Cr, Ta, Nb, Mn, Ni, Pd, Ru, and Rh. X represents a group or an atom selected from CO, halogen atoms, and a hydrogen atom. The halogen atom is an atom selected from a chlorine, a fluorine, a bromine and an iodine. The organic group Y is an organic group selected from cyclooctadiene, norbornadiene, acetylacetonate, olefins, dienes, alkylenes, and alkyls.

Each of n and m represents an integer.

Specific examples of the organometallic complexes include $Ni(cyclooctadiene)_2$ and $[Ru(norbornadiene)Cl]_2$.

Specific examples include $Ni(cyclooctadiene)_2$ and $[Ru(norbornadiene)Cl]_2$.

In the production method according to the present invention, the used amount of the metal compound or the organometallic complex catalyst is preferably 0.1 to 10 mol %, more preferably 1 to 5 mol % with respect to the amount of the starting monomers.

The compounds represented by Formulae (3) and (5) above are produced by various known methods. For example, an ethynyl compound of (3) or (5) is produced first, and substituent groups A and $A^1$ are introduced into the ethynyl compound in reaction. During production of the ethynyl compound, a substituted ketone compound is ethynylated in reaction with an ethynylmagnesium halide.

The acetylene-based polymer represented by the Formula (1) or (2) is oxidized. The oxidation is carried out in the following way.

For example for oxidation, the raw material may be brought into contact with an oxidizing agent such as a chlorine, an iodine, a nitric acid, a ferric chloride, or a gold trichloride directly in a gas or liquid phase. An oxidizing agent is added during the reaction.

The oxidation state can be controlled by adjustment of the concentration of the oxidizing agent, the temperature and the reaction time. It is possible to improve transparency and prevent coloring, by control of the oxidation degree. Favorable concentration of the oxidizing agent is 10 to 200 wt % with respect to the polymer, and favorable reaction temperature is 20 to 50° C. and the reaction time is 10 to 180 minutes.

When such an acetylene-based polymer is doped with an oxidizing agent, solitons represented by the following formula are formed on the main chain by abstraction of electrons from the main chain by oxidation, and the resultant change in the electronic state of the main chain seems to lead to increase in transparency and prevention of coloration, similarly to unsubstituted polyacetylenes.

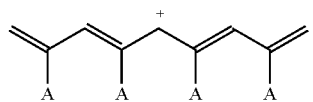

(wherein, A is the same as that described above, and the favorable examples are also the same as above).

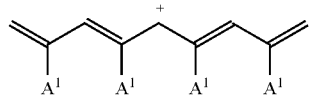

(wherein, $A^1$ is the same as that described above, and the favorable examples are also the same).

The substituted polyacetylene according to the present invention may be processed into a particular shape according to its application. For use as a coat, it may be coated on the surface of a base material. The base material is preferably a transparent material, and such materials include glass as well as homopolymers, copolymers and polymer blends of acrylic, vinyl, polyolefin, polyester, polyamide, polycarbonate and other resins, and these materials are used after arbitrary selection.

The method of coating on the base material is not particularly limited, but preferable is a method of coating and drying a solution obtained by dissolving the phenylacetylene-based polymeric compound above in a solvent such as toluene, chloroform or carbon tetrachloride on the base material, for example, by spin coating.

The thickness of the coated layer is selected arbitrarily according to application, but normally, preferably 100 Å to 100 μm, more preferably 1,000 to 10,000 Å.

The color tone of the coat layer obtained varied significantly according to the substituent group introduced. For example, poly(1-ethynylnaphthalene) having a long-chain alkyl group at 2 position showed change in crystallinity, shift of its absorption wavelength toward longer wavelength, and consequently, change in color from red purple to blue, as the length of the alkyl chain was increased. It is probably because elongation of the alkyl group leads to increased interaction among alkyl groups and consequently regularity of the primary and higher molecular structures increased. Further heating resulted in self structuring and crystallization of the resin, i.e., further increase in regularity in the primary and higher molecular structures, which in turn lead to further longer-wavelength shift of the absorption wavelength. The crystallization can be confirmed by comparison of wide-angle X-Ray scattering before and after heating. The heat treatment is preferably carried out at a temperature of 80 to 300° C., more preferably 150 to 250° C. The heating time is preferably 10 seconds to 10 minutes, more preferably 30 seconds to 5 minutes.

The present invention will be described in more detail based on examples given below, but the present invention is not intended to be limited thereto.

EXAMPLES

Example 1

(1) Preparation of 1-ethynyl-2-n-hexylnaphthalene

Under a nitrogen atmosphere at −50° C., 1.6 mol/l hexane solution of n-butyllithium was added to 30 ml of a tetrahydrofuran solution containing 3 g of ethynylnaphthalene. After cooling to −90° C., 15 ml of a tetrahydrofuran solution containing 2.5 g of potassium tertiary butoxide was added thereto, and the mixture was stirred at −80° C. for 1 hour and then allowed to warm to 5° C. 3.3 g of bromohexane was added dropwise at −70° C., and the mixture was stirred at 30° C. overnight. 100 ml of water was added dropwise at 0° C., and the compounds generated were extracted with added hexane. The hexane layer was washed thrice with 300 ml of distilled water and dried over anhydrous magnesium sulfate for 24 hours, and the mixture was then filtered and evaporated for removal of the solvent. After column purification and solvent removal, the product was purified by column chromatography while hexane was used as the developing solvent, to give 2.2 g of 1-ethynyl-2-n-hexylnaphthalene.

$^1$H NMR (270 MHz, CDCl$_3$) δ8.3 (1H), 7.8 (2H), 7.5 (3H), 3.6 (1H), 3.0 (2H), 1.7 (2H), 1.3 (6H), 0.9 (3H)

(2) Polymerization of 1-ethynyl-2-n-hexylnaphthalene 0.35 g of 1-ethynyl-2-n-hexylnaphthalene was polymerized in the presence of a WCl$_6$ catalyst, to give 0.25 g of poly(1-ethynyl-2-n-hexylnaphthalene)acetylene.

The weight-average molecular weight thereof was approximately 20,000. It was less soluble and thus, prohibited spin coating.

(3) Oxidation of 1-ethynyl-2-n-hexylnaphthalene polymer 5 mg of poly(1-ethynyl-2-n-hexylnaphthalene) was dissolved in 0.37 ml of chloroform; 1.5 mg of FeCl$_3$ was added; and the mixture was stirred at room temperature for 30 minutes, allowing oxidation of the polymer.

The poly(1-ethynyl-2-n-hexylnaphthalene) obtained after oxidation was spin-coated on the surface of a glass. The glass coated with obtained poly(1-ethynyl-2-n-hexylnaphthalene) was transparent and colorless.

Figure 1:
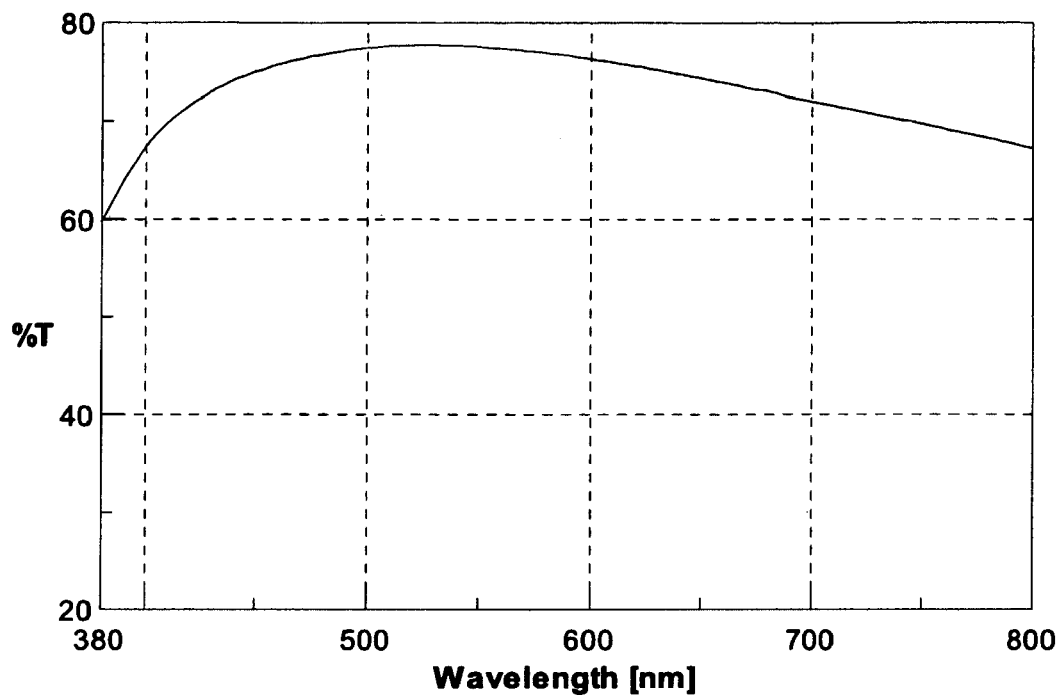
FIG. 1 is a graph showing the results of percent transmission measurement of a film of the poly(1-ethynyl-2-n-hexylnaphthalene) prepared in Example 1 that is previously oxidized with $FeCl_3$ and coated on a glass surface.

The percent transmission thereof determined is shown in FIG. 1.

The absorption spectrum in the visible light range of 380 to 780 nm was favorable. The percent transmission was also favorable.

Example 2

(1) Preparation of 1-ethynyl-2-methylnaphthalene 10 g of 1-bromo-2-methylnaphthalene, 0.63 g of dichlorobis(triphenylphosphine)palladium, 0.24 g of triphenylphosphine, 0.24 g of copper bromide, 0.95 g of lithium bromide, and 7.6 g of 3-methyl-1-butyn-3-ol were added to 20 ml of triethylamine, and the mixture was allowed to react at 90° C. for 8 hours.

After removal of the solvent by evaporator, the generated compounds were extracted with added ethyl ether. The ethyl ether layer was washed thrice with 300 ml of distilled water, dried over anhydrous magnesium sulfate for 24 hours, and filtered, and after evaporation of the solvent in the filtrate, the product was purified by column chromatography by using ethyl acetate/hexane (1/4) as the developing solvent.

30 ml of diethylene glycol and 4.4 g of potassium hydroxide were added to the compound obtained, and the mixture was stirred at 90° C. for 15 hours. The compound obtained was extracted with added ethyl ether. The ethyl ether layer was washed twice with 300 ml of distilled water, dried over anhydrous magnesium sulfate for 24 hours and filtered, and the solvent was evaporated. Column purification of the residue by using hexane as the developing solvent gave 3.5 g of 1-ethynyl-2-methylnaphthalene.

$^1$H NMR (270 MHz, CDCl$_3$) δ8.3 (1H), 7.8 (2H), 7.5 (3H), 3.7 (1H), 2.6 (3H)

(2) Polymerization of 1-ethynyl-2-methylnaphthalene 0.39 g of 1-ethynyl-2-methylnaphthalene was polymerized in the presence of a WCl$_6$ catalyst, to give 0.21 g of poly(1-ethynyl-2-methylnaphthalene).

The weight-average molecular weight thereof was approximately 200,000.

Figure 2:
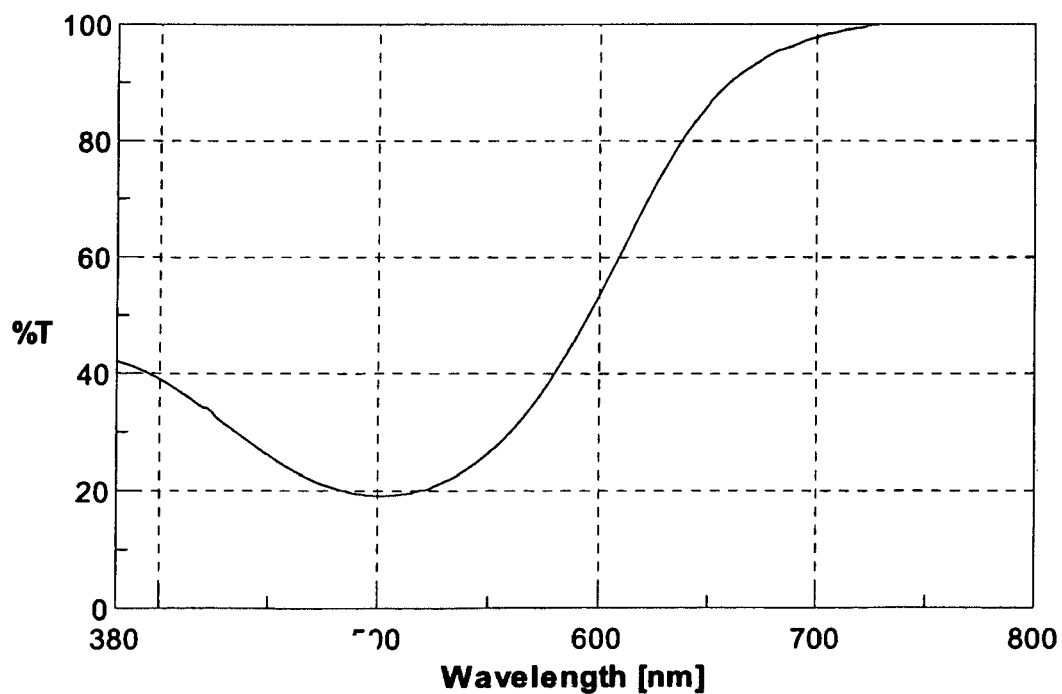
FIG. 2 is a graph showing the results of percent transmission measurement of a film of the poly(1-ethynyl-2-methylnaphthalene) prepared in Example 2 that is coated on a glass surface.

The film obtained by spin coating of the resulting polymer on the glass surface was red purple. The percent transmission thereof determined is shown in FIG. 2.

(3) Oxidation of 1-ethynyl-2-methylnaphthalene polymer 5 mg of poly(1-ethynyl-2-methylnaphthalene) was dissolved in 0.37 ml of chloroform, 1.5 mg of FeCl$_3$ was added thereto; and the mixture was stirred at room temperature for 30 minutes for oxidation.

The poly(1-ethynyl-2-methylnaphthalene) after completion of the oxidation was applied on the glass surface by spin coating. The poly(1-ethynyl-2-methylnaphthalene)-coated glass thus obtained was transparent and colorless.

Figure 3:
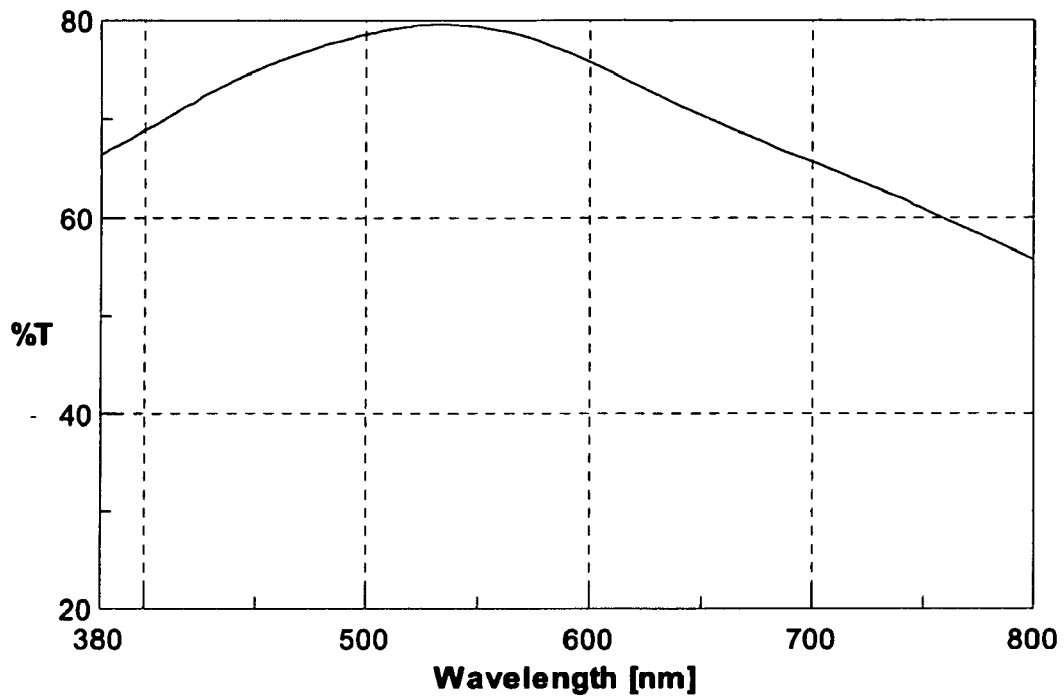
FIG. 3 is a graph showing the results of percent transmission measurement of a film of the poly(1-ethynyl-2-methylnaphthalene) prepared in Example 2 that is previously oxidized with $FeCl_3$ and coated on a glass surface.

The percent transmission thereof determined is shown in FIG. 3.

The absorption spectrum in the visible light range of 380 to 780 nm was favorable.

Example 3

(1) Preparation of 1-ethynyl-2-ethoxynaphthalene

Under a nitrogen atmosphere, 9.19 ml of 2 mol/l tetrahydrofuran solution of lithium diisopropyl amide was added dropwise to 3.3 g of 2-butoxyacetonaphthone at −78° C., and the mixture was stirred for 2 hours. After addition of 3.17 g of diethyl chlorophosphate, the mixture was stirred at room temperature for 1 hour. 2.65 ml of 2 mol/l tetrahydrofuran solution of lithium diisopropyl amide was added dropwise thereto at −78° C., and the mixture was stirred for 18 hours. The compounds obtained were extracted with added ethyl ether. The ethyl ether layer was washed twice with 300 ml of distilled water, dried over anhydrous magnesium sulfate for 24 hours and filtered, and the solvent was evaporated. The residue was subjected to column purification by using chloroform/hexane (1/4) as the developing solvent, to give 1.9 g of 1-ethynyl-2-ethoxynaphthalene.

$^1$H NMR (270 MHz, CDCl$_3$) δ8.3 (1H), 7.8 (2H), 7.5 (3H), 4.3 (2H), 4.1 (1H), 1.4 (3H)

(2) Polymerization of 1-ethynyl-2-ethoxynaphthalene 0.29 g of 1-ethynyl-2-ethoxynaphthalene was polymerized in the presence of a WCl$_6$ catalyst, to give poly(1-ethynyl-2-ethoxynaphthalene) (0.18 g).

The weight-average molecular weight thereof was approximately 50,000. The polymer, when spin-coated on a glass surface, was purple in color, and the percent transmission was shown in FIG. 18.

(3) Oxidation of 1-ethynyl-2-ethoxynaphthalene polymer 5 mg of poly(1-ethynyl-2-ethoxynaphthalene) was dissolved in 0.37 ml of chloroform; 1.5 mg of FeCl$_3$ was added thereto; and the mixture was stirred at room temperature for 30 minutes, allowing progress of oxidation reaction.

The poly(1-ethynyl-2-ethoxynaphthalene) after oxidation was spin-coated on a glass surface. The poly(1-ethynyl-2-ethoxynaphthalene)-coated glass was transparent and colorless.

Figure 4:
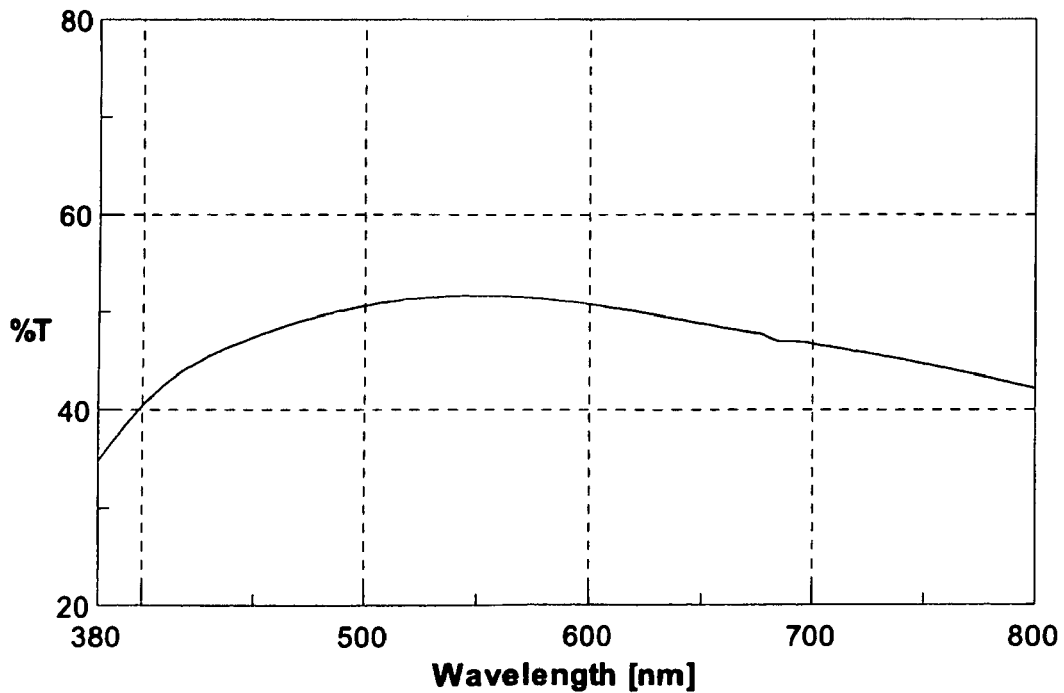
FIG. 4 is a graph showing the results of percent transmission measurement of a film of the poly(1-ethynyl-2-ethoxynaphthalene) prepared in Example 3 that is previously oxidized with $FeCl_3$ and coated on a glass surface.

The percent transmission thereof determined is shown in FIG. 4.

The absorption spectrum in the visible light range of 380 to 780 nm was favorable.

Reference Example 1

(1) Preparation of 1-ethynyl-2-ethylthionaphthalene

1-Ethynyl-2-ethylthionaphthalene was prepared in a similar manner to 1-ethynyl-2-methylnaphthalene, except that 1-bromo-2-methylnaphthalene was replaced by 1-bromo-2-ethylthionaphthalene.

$^1$H NMR (270 MHz, CDCl$_3$) δ8.3 (1H), 7.8 (2H), 7.5 (3H), 4.3 (2H), 4.2 (1H), 1.4 (3H)

Reference Example 2

(1) Preparation of ethyl 1-ethynyl-2-naphthoate

Ethyl 1-ethynyl-2-naphthoate was prepared in a similar manner to 1-ethynyl-2-methylnaphthalene, except that 1-bromo-2-methylnaphthalene was replaced by ethyl 1-bromo-2-naphthoate.

$^1$H NMR (270 MHz, CDCl$_3$) δ8.3 (1H), 7.8 (2H), 7.5 (3H), 4.4 (4H), 4.2 (1H), 1.4 (6H)

Reference Example 3

(1) Preparation of 1-ethynyl-2-diethylaminonaphthalene

1-Ethynyl-2-diethylaminonaphthalene was prepared in a similar manner to 1-ethynyl-2-methylnaphthalene, except that 1-bromo-2-methylnaphthalene was replaced by 1-bromo-2-diethylaminonaphthalene.

$^1$H NMR (270 MHz, CDCl$_3$) δ8.3 (1H), 7.8 (2H), 7.5 (3H), 4.2 (1H), 3.3 (4H), 1.2 (6H).

Example 4

(1) Preparation of 1-ethynyl-4-methylnaphthalene 6 g of 1-bromo-4-methylnaphthalene, 0.11 g of dichlorobis(triphenylphosphine)palladium, 0.17 g of triphenylphosphine, 0.19 g of copper iodide, and 3.1 g of trimethylsilylacetylene were added to 60 ml of triethylamine, and the mixture was allowed to react at 90° C. for 16 hours. After evaporation of the solvent by an evaporator, the compounds obtained were extracted with added ethyl ether. The ethyl ether layer was washed thrice with 300 ml of distilled water, dried over anhydrous magnesium sulfate for 24 hours, and filtered, and after removal of the solvent in the filtrate by vaporization, the residue was purified by column chromatography, by using hexane as the developing solvent. 30 ml of diethylene glycol and 4.4 g of potassium hydroxide were added to the compound obtained, and the mixture was stirred at room temperature for 3 hours. The compounds generated were extracted with added ethyl ether. The ethyl ether layer was washed twice with 300 ml of distilled water, dried over anhydrous magnesium sulfate for 24 hours and filtered, and the solvent in the filtrate was evaporated. The residue was purified by column chromatography by using methylene chloride/hexane (1/4) as the developing solvent, to give 1.6 g of 1-ethynyl-4-methylnaphthalene.

$^1$H NMR (270 MHz, CDCl$_3$) δ8.3 (1H), 7.8 (2H), 7.5 (3H), 3.4 (1H), 2.6 (3H)

(2) Polymerization of 1-ethynyl-4-methylnaphthalene 0.39 g of 1-ethynyl-4-methylnaphthalene was polymerized in the presence of a WCl$_6$ catalyst, to give 0.21 g of poly(1-ethynyl-4-methylnaphthalene).

The weight-average molecular weight thereof was approximately 50,000. The polymer, when spin-coated on a glass surface, was red purple in color, and the percent transmission thereof is shown in FIG. 19.

(3) Oxidation of 1-ethynyl-4-methylnaphthalene polymer 5 mg of poly(1-ethynyl-4-methylnaphthalene) was dissolved in 0.37 ml of chloroform; 1.5 mg of FeCl$_3$ was added thereto; and the mixture was stirred at room temperature for 30 minutes, allowing progress of oxidation reaction.

The poly(1-ethynyl-4-methylnaphthalene) after completion of oxidation was spin-coated on a glass surface. The poly(1-ethynyl-4-methylnaphthalene)-coated glass thus obtained was transparent and colorless.

Figure 5:
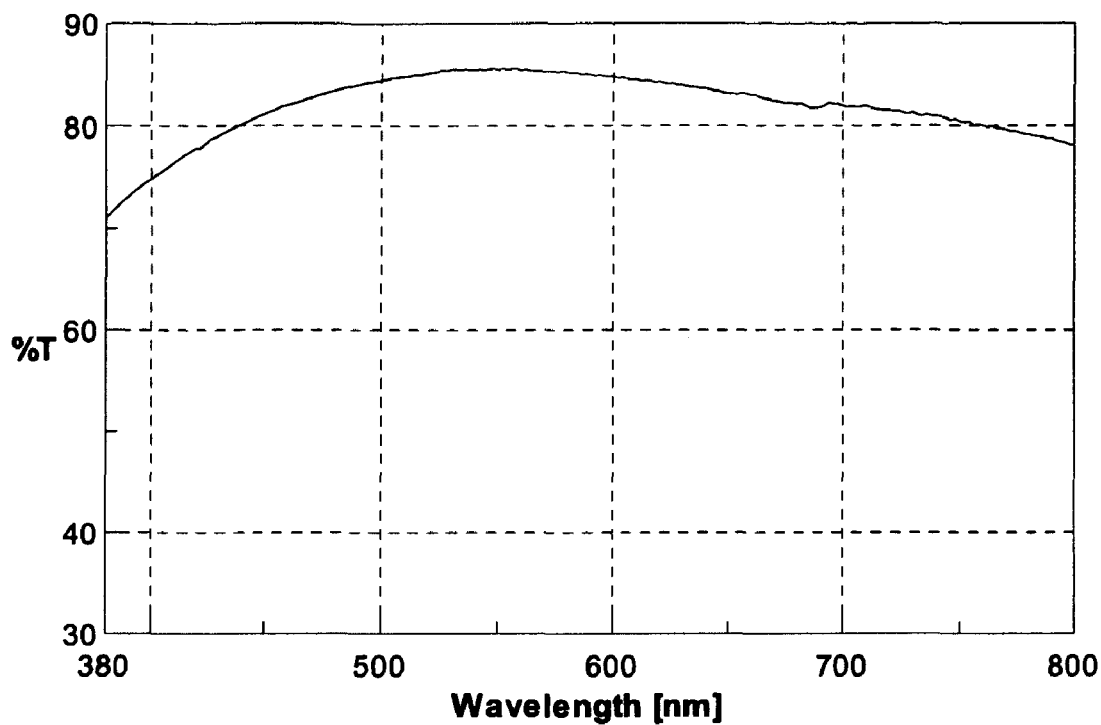
FIG. 5 is a graph showing the results of percent transmission measurement of a film of the poly(1-ethynyl-4-methylnaphthalene) prepared in Example 4 that is previously oxidized with $FeCl_3$ and coated on a glass surface.

The percent transmission thereof determined is shown in FIG. 5.

The absorption spectrum in the visible light range 380 to 780 nm was favorable.

Example 5

(1) Preparation of 1-ethynyl-2-n-decylnaphthalene

1-Ethynyl-2-n-decylnaphthalene was prepared in a similar manner to 1-ethynyl-2-hexylnaphthalene, except that bromohexane was replaced by bromodecane.

$^1$H NMR (270 MHz, CDCl$_3$) δ8.3 (1H), 7.8 (2H), 7.5 (3H), 3.6 (1H), 3.0 (2H), 1.7 (2H), 1.3 (16H), 0.9 (3H)

(2) Polymerization of 1-ethynyl-2-n-decylnaphthalene 1.0 g of 1-ethynyl-2-n-decylnaphthalene was polymerized in the presence of a WCl$_6$ catalyst, to give 0.6 g of poly(1-ethynyl-2-n-decylnaphthalene).

The weight-average molecular weight thereof was approximately 30,000.

Figure 6:
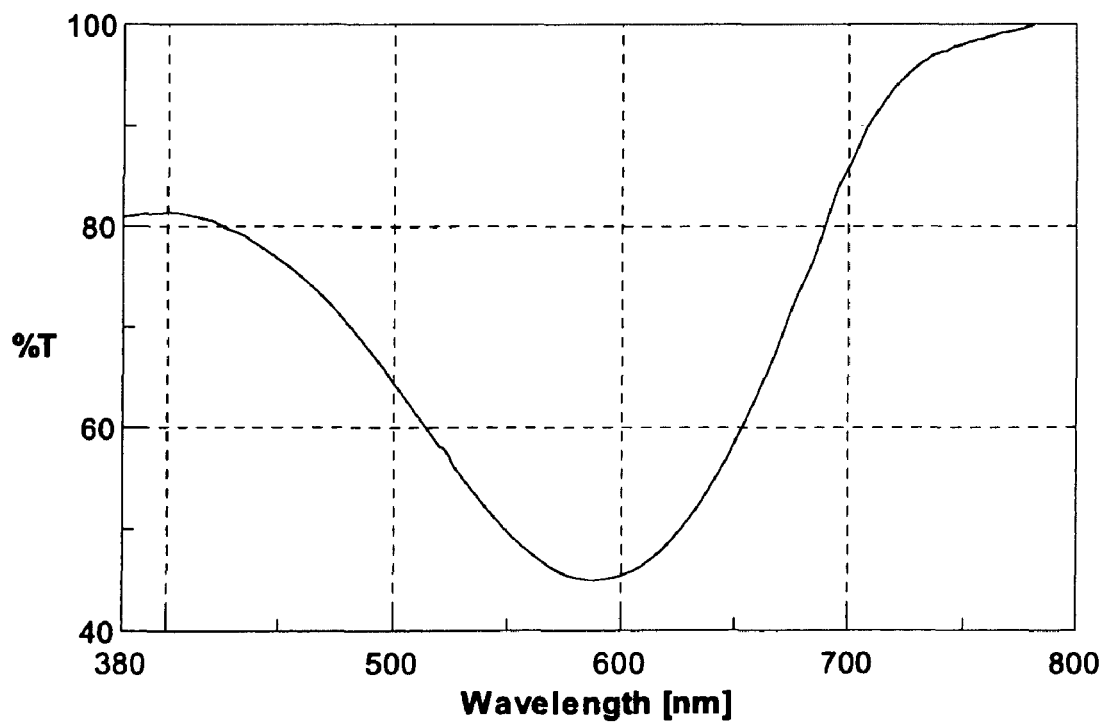
FIG. 6 is a graph showing the results of percent transmission measurement of a film of the poly(1-ethynyl-2-n-decylnaphthalene) prepared in Example 5 that is coated on a glass surface.

The polymer spin-coated on a glass surface was blue. The percent transmission thereof determined is shown in FIG. 6.

(3) Oxidation of 1-ethynyl-2-n-decyl polymer 5 mg of poly(1-ethynyl-2-n-decylnaphthalene) was dissolved in 0.37 ml of chloroform; 1.5 mg of AuCl$_3$ was added thereto; and the mixture was stirred at room temperature for 30 minutes, allowing progress of oxidation reaction.

The poly(1-ethynyl-2-n-decylnaphthalene) after completion of oxidation was spin-coated on a glass surface. The poly(1-ethynyl-2-n-decylnaphthalene)-coated glass thus obtained was transparent and colorless.

Figure 7:
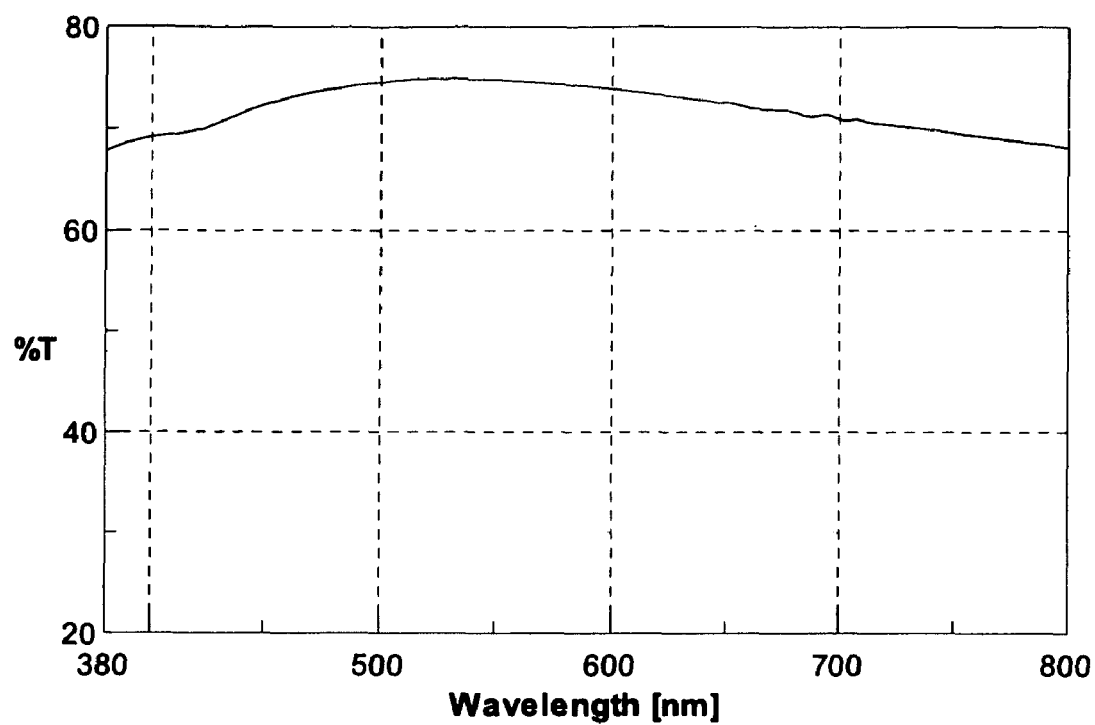
FIG. 7 is a graph showing the results of percent transmission measurement of a film of the poly(1-ethynyl-2-n-decylnaphthalene) prepared in Example 5 that is previously oxidized with $AuCl_3$ and coated on a glass surface.

The percent transmission thereof determined is shown in FIG. 7.

The absorption spectrum in the visible light range 380 to 780 nm was favorable. The percent transmission was favorable.

Example 6

(1) Preparation of 1-ethynyl-2-n-octadecylnaphthalene

1-Ethynyl-2-n-octadecylnaphthalene was prepared in a similar manner to 1-ethynyl-2-hexylnaphthalene, except that bromohexane was replaced by bromo-n-octadecane.

$^1$H NMR (270 MHz, CDCl$_3$) δ8.3 (1H), 7.8 (2H), 7.5 (3H), 3.6 (1H), 3.0 (2H), 1.7 (2H), 1.3 (32H), 0.9 (3H)

(2) Polymerization of 1-ethynyl-2-n-octadecylnaphthalene 1.0 g of 1-ethynyl-2-n-octadecylnaphthalene was polymerized in the presence of a WCl$_6$ catalyst, to give 0.5 g of poly(1-ethynyl-2-n-octadecylnaphthalene).

The weight-average molecular weight thereof was approximately 15,000.

Figure 8:
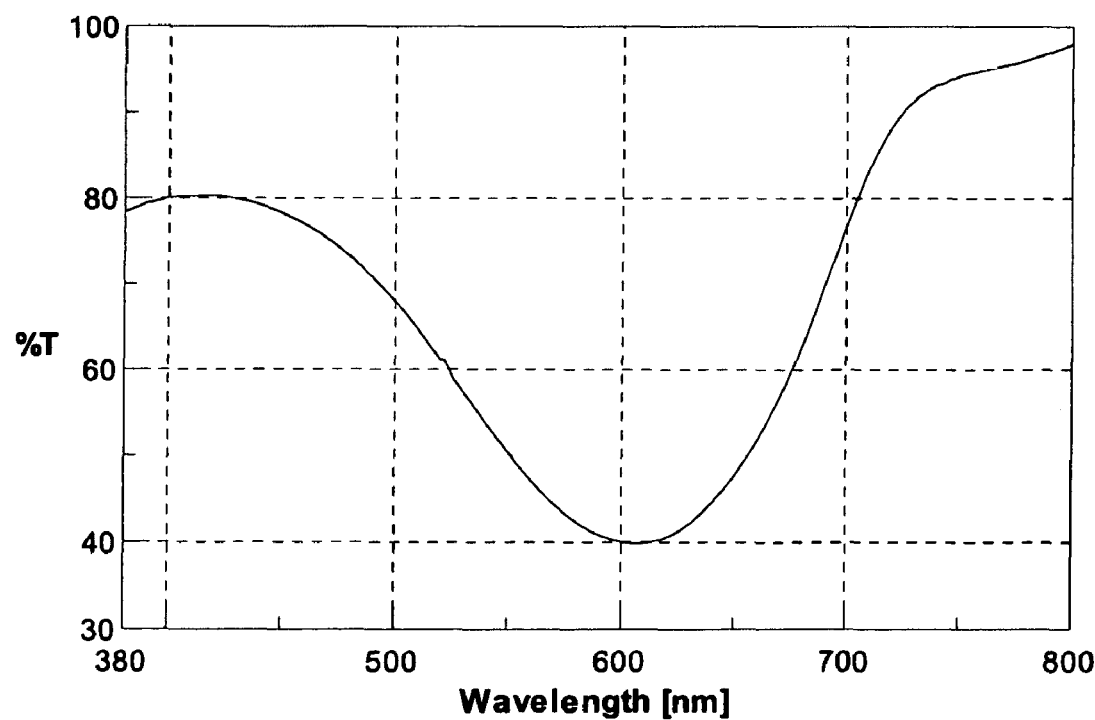
FIG. 8 is a graph showing the results of percent transmission measurement of a film of the poly(1-ethynyl-2-n-octadecylnaphthalene) prepared in Example 6 that is coated on a glass surface.

The polymer spin-coated on a glass surface was blue in color. The percent transmission thereof determined is shown in FIG. 8.

(3) Oxidation of 1-ethynyl-2-n-octadecyl polymer 5 mg of poly(1-ethynyl-2-n-octadecylnaphthalene) was dissolved in 0.37 ml of chloroform; 1.5 mg of AuCl$_3$ was added thereto; and the mixture was stirred at room temperature for 30 minutes, allowing progress of oxidation reaction.

The poly(1-ethynyl-2-n-octadecylnaphthalene) after completion of oxidation was spin-coated on a glass surface. The poly(1-ethynyl-2-n-octadecylnaphthalene)-coated glass was transparent and colorless.

Figure 9:
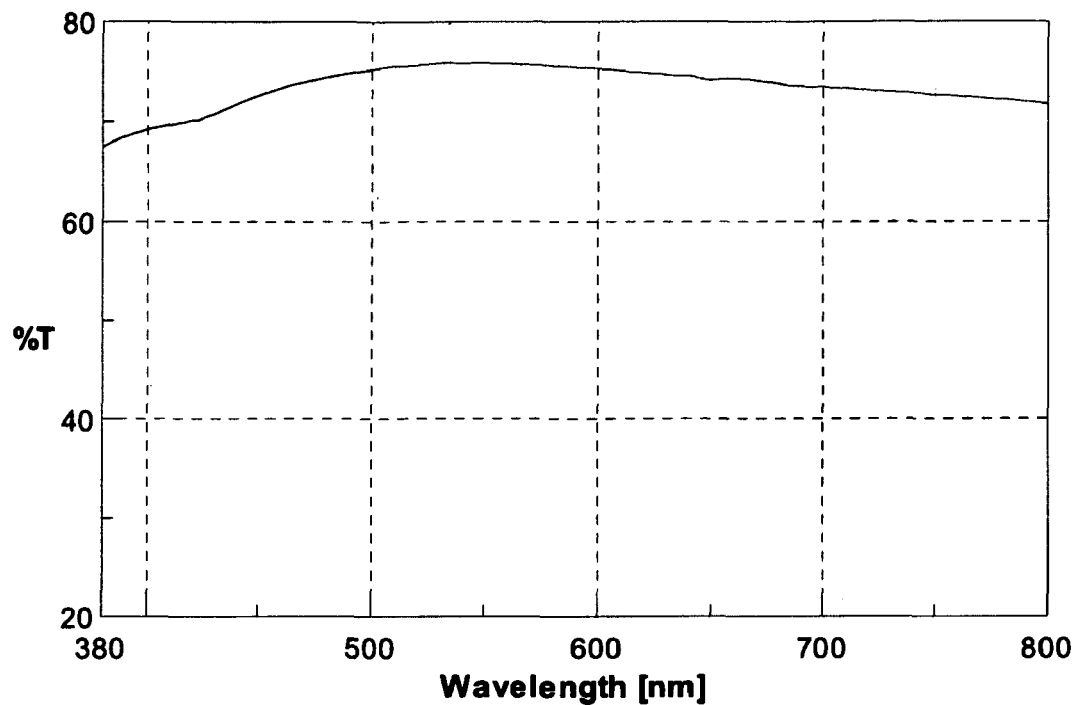
FIG. 9 is a graph showing the results of percent transmission measurement of a film of the poly(1-ethynyl-2-n-octadecylnaphthalene) prepared in Example 6 that is previously oxidized with $AuCl_3$ and coated on a glass surface.

The percent transmission thereof determined is shown in FIG. 9.

The absorption spectrum in the visible light range 380 to 780 nm was favorable. The percent transmission was favorable.

Example 7

(1) Preparation of 1-ethynyl-2-(3-phenylpropyl)naphthalene

1-Ethynyl-2-n-(3-phenylpropyl)naphthalene was prepared in a similar manner to 1-ethynyl-2-hexylnaphthalene, except that bromohexane was replaced by 1-bromo-3-phenylpropane.

$^1$H NMR (270 MHz, CDCl$_3$) δ8.3 (1H), 7.8 (2H), 7.6 (1H), 7.4 (9H), 2.8 (2H), 2.6 (2H), 2.0 (2H)

(2) Polymerization of 1-ethynyl-2-(3-phenylpropyl)naphthalene 1.0 g of 1-ethynyl-2-(3-phenylpropyl)naphthalene was polymerized in the presence of a WCl$_6$ catalyst, to give 0.35 g of poly(1-ethynyl-2-(3-phenylpropyl)naphthalene).

The weight-average molecular weight thereof was approximately 12,000. The polymer spin-coated on a glass surface was purple in color and the percent transmission is shown in FIG. 20.

(3) Oxidation of 1-ethynyl-2-(3-phenylpropyl)naphthalene polymer 5 mg of poly(1-ethynyl-2-(3-phenylpropyl)naphthalene) was dissolved in 0.37 ml of chloroform; 1.5 mg of AuCl$_3$ was added thereto; and the mixture was stirred at room temperature for 30 minutes, allowing progress of oxidation reaction.

The poly(1-ethynyl-2-(3-phenylpropyl)naphthalene) after completion of oxidation was spin-coated on a glass surface. The poly(1-ethynyl-2-(3-phenylpropyl)naphthalene)-coated glass thus obtained was transparent and colorless.

Figure 10:
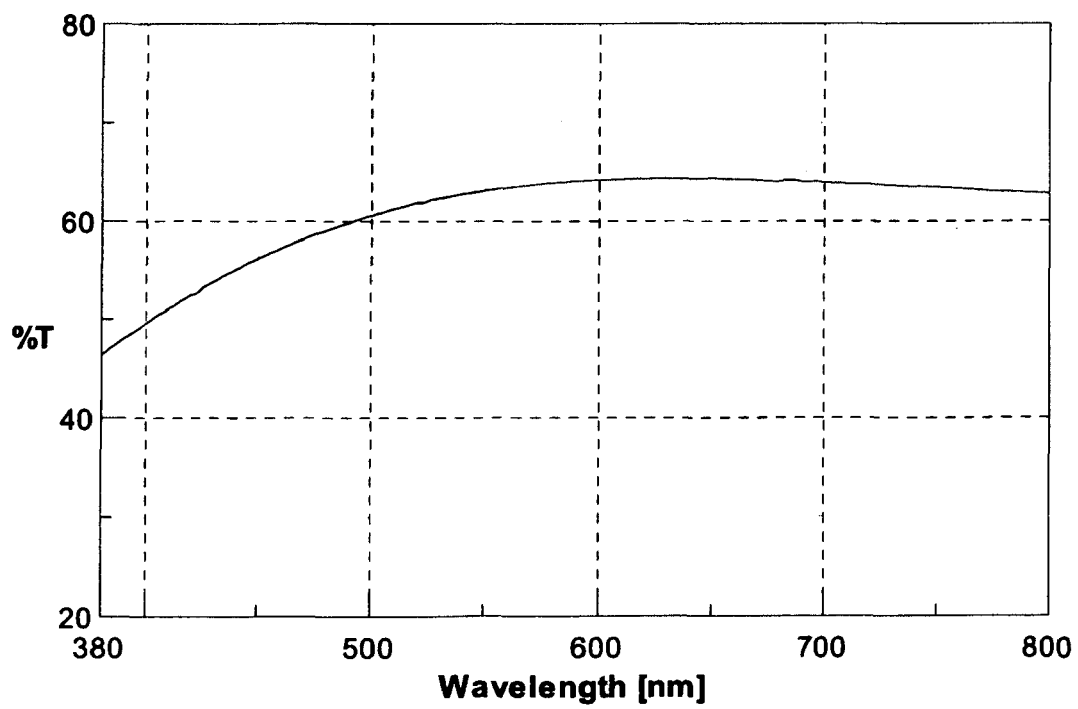
FIG. 10 is a graph showing the results of percent transmission measurement of a film of the poly(1-ethynyl-2-n-(3- phenylpropyl)naphthalene) prepared in Example 7 that is previously oxidized with AuCl$_3$ and coated on a glass surface.

The percent transmission thereof determined is shown in FIG. 10.

The absorption spectrum in the visible light range 380 to 780 nm was favorable. The percent transmission was also favorable.

Example 8

(1) Preparation of 1-ethynyl-2-(2-ethylhexyl)naphthalene

1-Ethynyl-2-(2-ethylhexyl)naphthalene was prepared in a similar manner to 1-ethynyl-2-hexylnaphthalene, except that bromohexane was replaced by 1-bromo-2-ethylhexane.

$^1$H NMR (270 MHz, CDCl$_3$) δ8.3 (1H), 7.8 (2H), 7.5 (3H), 3.6 (1H), 3.0 (2H), 1.7 (2H), 1.3 (32H), 0.9 (3H)

(2) Polymerization of 1-ethynyl-2-(2-ethylhexyl)naphthalene 1.0 g of 1-ethynyl-2-(2-ethylhexyl)naphthalene was polymerized in the presence of a WCl$_6$ catalyst, to give 0.25 g of poly(1-ethynyl-2-(2-ethylhexyl)naphthalene).

The weight-average molecular weight thereof was approximately 18,000. The polymer spin-coated on a glass surface was blue in color, and the percent transmission is shown in FIG. 21.

(3) Oxidation of 1-ethynyl-2-(2-ethylhexyl)naphthalene polymer 5 mg of poly(1-ethynyl-2-(2-ethylhexyl)naphthalene) was dissolved in 0.37 ml of chloroform; 1.5 mg of AuCl$_3$ was added thereto; and the mixture was stirred at room temperature for 30 minutes, allowing progress of oxidation reaction.

After completion of oxidation, the poly(1-ethynyl-2-(2-ethylhexyl)naphthalene) was spin-coated on a glass surface. The poly(1-ethynyl-2-(2-ethylhexyl)naphthalene)-coated glass thus obtained was transparent and colorless.

The percent transmission thereof determined is shown in FIG. 11.

The absorption spectrum in the visible light range 380 to 780 nm was favorable. The percent transmission was also favorable.

Example 9

(1) Preparation of 1-ethynyl-2-(2-(S)-methylbutyl) naphthalene

1-Ethynyl-2-(2-(S)-methylbutyl)naphthalene was prepared in a similar manner to 1-ethynyl-2-hexylnaphthalene, except that bromohexane was replaced by 1-bromo-2-(S)-methylbutane.

$^1$H NMR (270 MHz, CDCl$_3$) δ8.3 (1H), 7.7 (2H), 7.4 (1H), 7.3 (1H), 7.2 (1H), 7.2 (1H), 4.0 (1H), 3.9 (1H), 2.0 (2H), 1.9 (1H), 1.6 (1H), 1.3 (1H), 1.0 (3H), 0.9 (3H)

(2) Polymerization of 1-ethynyl-2-(2-(S)-methylbutyl)naphthalene 0.5 g of 1-ethynyl-2-(2-(S)-methylbutyl)naphthalene was polymerized in the presence of a WCl$_6$ catalyst, to give 0.24 g of poly(1-ethynyl-2-(2-(S)-methylbutyl)naphthalene).

The weight-average molecular weight thereof was approximately 15,000. The polymer had low solubility and was thus could not be used in spin coating.

(3) Oxidation of 1-ethynyl-2-(2-(S)-methylbutyl) naphthalene polymer 5 mg of poly(1-ethynyl-2-(2-(S)-methylbutyl)naphthalene) was dissolved in 0.37 ml of chloroform; 1.5 mg of FeCl$_3$ was added thereto; and the mixture was stirred at room temperature for 30 minutes, allowing progress of oxidation reaction.

The poly(1-ethynyl-2-(2-(S)-methylbutyl)naphthalene) after completion of oxidation was spin-coated on a glass surface. The poly(1-ethynyl-2-(2-ethylhexyl)naphthalene)-coated glass thus obtained was transparent and colorless.

The results of percent transmission and CD spectrum measurement are shown in FIG. 12. There was no peak observed both in the absorption spectrum and the CD spectrum in the visible light range of 380 to 780 nm.

The film, when exposed to ammonia vapor under normal temperature and normal pressure for 1 minute, changed its color to red purple. The results of percent transmission and CD spectrum measurement are shown in FIG. 12. The absorption spectrum had a peak top at around 580 nm, and showed a Cotton effect of having a positive peak at around 630 nm and a negative peak at around 530 nm.

Example 10

(1) Polymerization of 1-ethynyl-2-(2-(S)-methylbutyl)naphthalene 0.2 g of 1-ethynyl-2-(2-(S)-methylbutyl)naphthalene was polymerized in the presence of a MoCl$_5$ catalyst, to give 0.02 g of poly(1-ethynyl-2-(2-(S)-methylbutyl)naphthalene).

The weight-average molecular weight thereof was approximately 9,000. The polymer spin-coated on a glass surface was blue purple in color and the percent transmission was shown in FIG. 22.

(2) Oxidation of 1-ethynyl-2-(2-(S)-methylbutyl) naphthalene polymer 5 mg of poly(1-ethynyl-2-(2-(S)-methylbutyl)naphthalene) was dissolved in 150 mg of chloroform, and the solution was spin-coated on a glass surface. The poly(1-ethynyl-2-(2-(S)-methylbutyl)naphthalene)-coated glass thus obtained was transparent and colorless.

The results of percent transmission and CD spectrum measurement are shown in FIG. 13. The absorption spectrum had a peak top at around 550 nm, and showed a Cotton effect of having a negative peak at around 600 nm and a positive peak at around 500 nm.

The film, when exposed to nitric acid vapor under normal temperature and normal pressure for 1 minute, changed its color to transparent. The results of percent transmission and CD spectrum measurement are shown in FIG. 13. There was no peak both in the absorption and CD spectra in the visible light range of 380 to 780 nm.

The film, when exposed to ammonia vapor under normal temperature and normal pressure for 1 minute, changed its color to red purple. The absorption spectrum had a peak having the absorption maximum at around 550 nm once again, and the CD spectrum showed a Cotton effect of having a negative peak at around 600 nm and a positive peak at around 500 nm.

Example 11

5 mg of poly(1-ethynyl-2-n-octadecylnaphthalene) was dissolved in 150 mg of chloroform, and the solution was spin-coated on a glass surface. The poly(1-ethynyl-2-n-octadecylnaphthalene)-coated glass thus obtained was blue in color. The percent transmission measurement results are shown in FIG. 14. It had a spectrum having the absorption maximum at around 600 nm. The absorption maximum of the film shifted to a longer wavelength of around 630 nm and the absorbance increased when the film was heated at 200° C. for 5 minutes. The results indicated that the conjugation of main chains was elongated by heating.

The results of wide-angle X-Ray scattering before and after heating are shown in FIG. 15. Although there was almost no sharp peak before heating, there were sharp peaks at around 3.1°, 6.2° and 9.4° after heating at 200° C. for 5 minutes, indicating progress of crystallization.

Comparative Example 1

5 mg of poly(o-trimethylsilylphenyl acetylene) was dissolved in 0.37 ml of chloroform; 1.5 mg of FeCl$_3$ was added; and the mixture was stirred at room temperature for 30 minutes, allowing oxidation of the polymer. The poly(o-trimethylsilylphenyl acetylene) obtained after oxidation was spin-coated on the surface of a transparent glass. The percent transmission thereof determined is shown in FIG. 16.

The absorbance in the visible light range of 380 to 780 nm was smaller than that of FIGS. 1, 3, 7, 9, 10 and 11 in the specification. The film was also colored.

Comparative Example 2

5 mg of poly(o-trimethylsilylphenyl acetylene) was dissolved in 0.37 ml of chloroform; 1.5 mg of FeCl$_3$ was added;

and the mixture was stirred at room temperature for 30 minutes, allowing oxidation of the polymer. The poly(o-trimethylsilylphenyl acetylene) obtained after oxidation was spin-coated on the surface of a transparent glass. The percent transmission thereof determined is shown in FIG. 17.

The transmittance in the visible light range of 380 to 780 nm was inferior to that of FIGS. 1, 3, 7, 9, 10 and 11 in the specification. The film was also colored.

INDUSTRIAL APPLICABILITY

The acetylene-based polymer according to the present invention is highly resistant to solvent and heat, soluble in various organic solvents, and colored, and allows modification of the conjugate length by the length of the side-chain substituent group. The acetylene-based polymer is converted into a colorless transparent state by simple chemical oxidation/reduction treatment. The acetylene-based polymer according to the present invention with such properties is useful as a material for transparent conductive materials, transparent nonlinear optical materials and electrochromic elements. In addition, it can also be used in applications such as electronic paper and transparent electromagnetic shield.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. An acetylene-based polymer, comprising n recurring units represented by the following Formula (1):

   (1)

wherein, n is an integer of 10 to 10,000; each A represents an aryl group selected from a naphthyl group, a phenanthryl group, a pyrenyl group and an anthryl group, which aryl group is mono-substituted with a group selected from alkyl groups having 1 to 40 carbon atoms, alkyl groups substituted with aromatic hydrocarbon groups (alkyl groups having 1 to 40 carbon atoms), $R^1$—O— groups ($R^1$ is an alkyl group having 1 to 40 carbon atoms), —S—$R^2$ groups ($R^2$ is a hydrogen atom or an alkyl group having 1 to 40 carbon atoms), —$NR^3R^4$ groups ($R^3$ and $R^4$ are a hydrogen atom or an alkyl group having 1 to 40 carbon atoms, which may be the same as or different from each other), a cyano group, a carboxyl group, $R^5SO_2$— groups ($R^5$ is an alkyl group having 1 to 40 carbon atoms), —CON($R^7$)($R^8$) groups ($R^7$ and $R^8$ are a hydrogen atom or an alkyl group having 1 to 40 carbon atoms, which may be the same as or different from each other) and —$COR^9$ groups ($R^9$ is an alkyl group having 1 to 40 carbon atoms); and the recurring units may be the same as or different from each other.

2. An acetylene-based polymer, comprising n recurring units represented by the following Formula (2):

   (2)

wherein, n is an integer of 10 to 10,000; each $A^1$ represents a 1-naphthyl group or a 2-naphthyl group, which is mono- or di-substituted, at the positions of 2, 3 or 4 when it is a 1-naphthyl group or at the positions of 1, 3 or 4 when it is a 2-naphthyl group, with a group selected from alkyl groups having 1 to 40 carbon atoms, alkyl groups substituted with aromatic hydrocarbon groups (alkyl groups having 1 to 40 carbon atoms), $R^{10}$—O— groups ($R^{10}$ is an alkyl group having 1 to 40 carbon atoms), —S—$R^{11}$ groups ($R^{11}$ is a hydrogen atom or an alkyl group having 1 to 40 carbon atoms), —$NR^{12}R^{13}$ groups ($R^{12}$ and $R^{13}$ are a hydrogen atom or an alkyl group having 1 to 40 carbon atoms, which may be the same as or different from each other), a cyano group, a carboxyl group, $R^{14}SO_2$— groups ($R^{14}$ is an alkyl group having 1 to 40 carbon atoms), —$COOR^{15}$ groups ($R^{15}$ is an alkyl group having 1 to 40 carbon atoms), —CON($R^{16}$)($R^{17}$) groups ($R^{16}$ and $R^{17}$ are a hydrogen atom or an alkyl group having 1 to 40 carbon atoms, which may be the same as or different from each other) and —$COR^{18}$ groups ($R^{18}$ is an alkyl group having 1 to 40 carbon atoms); and the recurring units may be the same as or different from each other.

3. An acetylene-based polymer, obtained by oxidation of the acetylene-based polymer according to claim 1 for removal of the main chain electrons.

4. An acetylene-based polymer, obtained by oxidation of the acetylene-based polymer according to claim 2 for removal of the main chain electrons.

5. An acetylene-based polymer, comprising n recurring units represented by the following Formula (2):

   (2)

wherein, n is an integer of 10 to 10,000; each $A^1$ represents a 1-naphthyl group or a 2-naphthyl group, which is mono- or di-substituted, at the positions of 2, 3 or 4 when it is a 1-naphthyl group or at the positions of 1, 3 or 4 when it is a 2-naphthyl group, with a group selected from alkyl groups having 1 to 40 carbon atoms, alkyl groups substituted with aromatic hydrocarbon groups (alkyl groups having 1 to 40 carbon atoms), $R^{10}$—O— groups ($R^{10}$ is an alkyl group having 1 to 40 carbon atoms), —S—$R^{11}$ groups ($R^{11}$ is a hydrogen atom or an alkyl group having 1 to 40 carbon atoms), —$NR^{12}R^{13}$ groups ($R^{12}$ and $R^{13}$ are a hydrogen atom or an alkyl group having 1 to 40 carbon atoms, which may be the same as or different from each other), a cyano group, a carboxyl group, $R^{14}SO_2$— groups ($R^{14}$ is an alkyl group having 1 to 40 carbon atoms), —$COOR^{15}$ groups ($R^{15}$ is an alkyl group having 1 to 40 carbon atoms), —CON($R^{16}$)($R^{17}$) groups ($R^{16}$ and $R^{17}$ are a hydrogen atom or an alkyl group having 1 to 40 carbon atoms, which may be the same as or different from each other) and —$COR^{18}$ groups ($R^{18}$ is an alkyl group having 1 to 40 carbon atoms), where at least one of these groups is a group having chirality; and the recurring unit may be the same as or different from each other.

6. An acetylene-based polymer, obtained by oxidation of the acetylene-based polymer according to claim 5 for removal of the main chain electrons.

7. An acetylene-based polymer, obtained by heat treatment of the acetylene-based polymer according to claim 1 for imparting crystallinity.

8. An acetylene-based polymer, obtained by heat treatment of the acetylene-based polymer according to claim 2 for imparting crystallinity.

9. An acetylene-based polymer, obtained by heat treatment of the acetylene-based polymer according to claim 5 for imparting crystallinity.

10. An acetylene-based polymer, comprising n recurring units represented by the following Formula (1):

   (1)

wherein, n is an integer of 10 to 10,000; each A represents an aryl group selected from a naphthyl group, a 9-phenanthryl group, a pyrenyl group and an anthryl group, which aryl group is mono- or di-substituted with a substituent group selected from alkyl groups having 1 to 40 carbon atoms, alkyl groups substituted with aromatic hydrocarbon groups (alkyl groups having 1 to 40 carbon atoms), $R^1$—O— groups ($R^1$ is an alkyl group having 1 to 40 carbon atoms), —S—$R^2$ groups ($R^2$ is a hydrogen atom or an alkyl group having 1 to 40 carbon atoms), —NR³R⁴ groups (R³ and R⁴ are a hydrogen atom or an alkyl group having 1 to 40 carbon atoms, which may be the same as or different from each other), a cyano group, a carboxyl group, R⁵SO₂— groups (R⁵ is an alkyl group having 1 to 40 carbon atoms), —CON(R⁷)(R⁸) groups (R⁷ and R⁸ are a hydrogen atom or an alkyl group having 1 to 40 carbon atoms, which may be the same as or different from each other) and —COR⁹ groups (R⁹ is an alkyl group having 1 to 40 carbon atoms); wherein, when A represents a 9-phenanthryl group, a substituent group is at position 10; and the recurring units may be the same as or different from each other.

11. An acetylene-based polymer, comprising n recurring units represented by the following Formula (1):

(1)

wherein, n is an integer of 10 to 10,000; each A represents an aryl group selected from a naphthyl group, a 1-phenanthryl group, a pyrenyl group and an anthryl group, which aryl group is mono- or di-substituted with a substituent group selected from alkyl groups having 1 to 40 carbon atoms, alkyl groups substituted with aromatic hydrocarbon groups (alkyl groups having 1 to 40 carbon atoms), R¹—O— groups (R¹ is an alkyl group having 1 to 40 carbon atoms), —S—R² groups (R² is a hydrogen atom or an alkyl group having 1 to 40 carbon atoms), —NR³R⁴ groups (R³ and R⁴ are a hydrogen atom or an alkyl group having 1 to 40 carbon atoms, which may be the same as or different from each other), a cyano group, a carboxyl group, R⁵SO₂— groups (R⁵ is an alkyl group having 1 to 40 carbon atoms), —CON(R⁷)(R⁸) groups (R⁷ and R⁸ are a hydrogen atom or an alkyl group having 1 to 40 carbon atoms, which may be the same as or different from each other) and —COR⁹ groups (R⁹ is an alkyl group having 1 to 40 carbon atoms); wherein, when A represents a 1-phenanthryl group, a substituent group is at position 2; and the recurring units may be the same as or different from each other.

12. An acetylene-based polymer, obtained by oxidation of the acetylene-based polymer according to claim 10 for removal of the main chain electrons.

13. An acetylene-based polymer, obtained by heat treatment of the acetylene-based polymer according to claim 10 for imparting crystallinity.

14. An acetylene-based polymer, obtained by oxidation of the acetylene-based polymer according to claim 11 for removal of the main chain electrons.

15. An acetylene-based polymer, obtained by heat treatment of the acetylene-based polymer according to claim 11 for imparting crystallinity.

* * * * *